US010825454B1

(12) United States Patent
Mutagi et al.

(10) Patent No.: US 10,825,454 B1
(45) Date of Patent: *Nov. 3, 2020

(54) NAMING DEVICES VIA VOICE COMMANDS

(71) Applicant: Amazon Technologies, Inc., Seattle, WA (US)

(72) Inventors: Rohan Mutagi, Redmond, WA (US); Isaac Michael Taylor, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 24 days.

This patent is subject to a terminal disclaimer.

(21) Appl. No.: 16/031,909

(22) Filed: Jul. 10, 2018

Related U.S. Application Data

(63) Continuation of application No. 14/980,533, filed on Dec. 28, 2015, now Pat. No. 10,026,401.

(51) Int. Cl.
  *G10L 15/22* (2006.01)
  *G06F 3/16* (2006.01)

(52) U.S. Cl.
  CPC .............. *G10L 15/22* (2013.01); *G06F 3/167* (2013.01); *G10L 2015/223* (2013.01)

(58) Field of Classification Search
  CPC . G10L 15/22; G10L 15/265; G10L 2015/223; G06F 3/167
  USPC ........................................................ 704/235
  See application file for complete search history.

(56) References Cited

U.S. PATENT DOCUMENTS

| | | | |
|---|---|---|---|
| 6,757,656 B1 * | 6/2004 | Gong .................... | G10L 15/22 704/270 |
| 7,254,708 B2 * | 8/2007 | Silvester ................ | H04L 63/08 713/170 |
| 8,340,975 B1 | 12/2012 | Rosenberger | |
| 9,431,021 B1 * | 8/2016 | Scalise ................... | G10L 21/00 |
| 9,536,527 B1 | 1/2017 | Carlson | |
| 9,626,456 B2 | 4/2017 | Kozan | |
| 9,916,839 B1 * | 3/2018 | Scalise ................... | G10L 21/00 |
| 9,984,686 B1 * | 5/2018 | Mutagi ............... | H04L 12/2816 |
| 2002/0049822 A1 * | 4/2002 | Burkhardt .............. | G06F 15/17 709/208 |
| 2002/0069063 A1 * | 6/2002 | Buchner ............ | H04L 12/2803 704/270 |
| 2002/0156634 A1 | 10/2002 | Blum et al. | |
| 2002/0193989 A1 | 12/2002 | Geilhufe et al. | |
| 2003/0093281 A1 | 5/2003 | Geilhufe et al. | |

(Continued)

OTHER PUBLICATIONS

Office Action for U.S. Appl. No. 14/980,844, dated Feb. 9, 2017, Mutagi, et al., "Naming Devices via Voice Commands", 13 pages.

(Continued)

*Primary Examiner* — Daniel C Washburn
*Assistant Examiner* — Oluwadamilola M Ogunbiyi
(74) *Attorney, Agent, or Firm* — Lee & Hayes, P.C.

(57) ABSTRACT

Techniques for naming devices via voice commands are described herein. For instance, a user may issue a voice command to a voice-controlled device stating, "you are the kitchen device". Thereafter, the device may respond to voice commands directed, by name, to this device. For instance, the user may issue a voice command requesting to "play music on my kitchen device". Given that the user has configured the device to respond to this name, the device may respond to the command by outputting the requested music.

20 Claims, 13 Drawing Sheets

(56) References Cited

U.S. PATENT DOCUMENTS

| | | | |
|---|---|---|---|
| 2003/0163324 A1* | 8/2003 | Abbasi | G10L 15/22 704/275 |
| 2003/0172271 A1 | 9/2003 | Silvester | |
| 2006/0047513 A1 | 3/2006 | Chen | |
| 2008/0046250 A1 | 2/2008 | Agapi et al. | |
| 2008/0082338 A1 | 4/2008 | O'Neil et al. | |
| 2008/0248797 A1* | 10/2008 | Freeman | H04M 1/72533 455/425 |
| 2010/0056055 A1 | 3/2010 | Ketari | |
| 2011/0106534 A1 | 5/2011 | LeBeau et al. | |
| 2011/0161076 A1 | 6/2011 | Davis et al. | |
| 2012/0035924 A1 | 2/2012 | Jitkoff et al. | |
| 2012/0069131 A1 | 3/2012 | Abelow | |
| 2012/0089713 A1 | 4/2012 | Carriere | |
| 2012/0176313 A1 | 7/2012 | Ryu et al. | |
| 2013/0125195 A1* | 5/2013 | Lee | H04L 29/0809 725/131 |
| 2013/0132094 A1 | 5/2013 | Lim | |
| 2014/0149122 A1 | 5/2014 | Zhang | |
| 2014/0168130 A1* | 6/2014 | Hirai | G10L 15/00 345/173 |
| 2014/0254820 A1 | 9/2014 | Gardenfors et al. | |
| 2014/0282978 A1 | 9/2014 | Lerner et al. | |
| 2014/0343946 A1 | 11/2014 | Torok et al. | |
| 2015/0003323 A1 | 1/2015 | Ma | |
| 2015/0039319 A1 | 2/2015 | Mei et al. | |
| 2015/0103249 A1 | 4/2015 | Jung et al. | |
| 2015/0106089 A1* | 4/2015 | Parker | G06F 1/3206 704/235 |
| 2015/0154976 A1 | 6/2015 | Mutagi | |
| 2015/0162006 A1* | 6/2015 | Kummer | G05B 15/02 704/275 |
| 2015/0170664 A1* | 6/2015 | Doherty | G08C 17/02 704/275 |
| 2015/0348554 A1 | 12/2015 | Orr et al. | |
| 2016/0019546 A1 | 1/2016 | Eisen | |
| 2016/0036764 A1 | 2/2016 | Dong et al. | |
| 2016/0104480 A1 | 4/2016 | Sharifi | |
| 2016/0110347 A1 | 4/2016 | Kennewick, Jr. et al. | |
| 2016/0155443 A1* | 6/2016 | Khan | G06F 1/3203 704/275 |
| 2016/0179462 A1* | 6/2016 | Bjorkengren | G06F 3/167 704/275 |
| 2016/0203338 A1 | 7/2016 | Dabbiru et al. | |
| 2016/0302049 A1 | 10/2016 | Goldman et al. | |
| 2016/0328205 A1 | 11/2016 | Agrawal et al. | |
| 2016/0328550 A1 | 11/2016 | Pritchard et al. | |
| 2016/0379632 A1* | 12/2016 | Hoffmeister | G10L 15/18 704/253 |
| 2017/0006453 A1 | 1/2017 | Liu et al. | |
| 2017/0017763 A1 | 1/2017 | Zimmer | |
| 2017/0070478 A1 | 3/2017 | Park et al. | |
| 2017/0262523 A1 | 9/2017 | Epstein et al. | |
| 2019/0279637 A1* | 9/2019 | Li | G06F 3/167 |

OTHER PUBLICATIONS

Office Action for U.S. Appl. No. 14/980,844, dated Jul. 12, 2017, Mutagi, et al., "Naming Devices via Voice Commands", 12 pages.

Office Action fo U.S. Appl. No. 14/980,533, dated Aug. 21, 2017, Mutagi, "Naming Devices via Voice Commands", 15 pages.

Office Action for U.S. Appl. No. 14/980,645, dated Aug. 30, 2017, Mutagi, "Naming Devices via Voice Commands", 11 pages.

* cited by examiner

NAMING DEVICES VIA VOICE COMMANDS

CROSS-REFERENCE TO RELATED APPLICATIONS

This application is a continuation of, and claims priority to, co-pending, commonly-owned U.S. patent application Ser. No. 14/980,533, entitled "Naming Devices via Voice Commands", filed on Dec. 28, 2015, which is incorporated herein in its entirety by reference.

BACKGROUND

Homes are becoming more wired and connected with the proliferation of computing devices such as desktops, tablets, entertainment systems, and portable communication devices. As these computing devices evolve, many different ways have been introduced to allow users to interact with computing devices, such as through mechanical devices (e.g., keyboards, mice, etc.), touch screens, motion, and gesture. Another way to interact with computing devices is through speech.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 9 is a flow diagram of an example process for determining whether a voice command captured by audio signals from different devices is direct to a first of the devices or the second of the devices. For instance, in instances where both a first and a second voice-controlled device generates an audio signal that includes a voice command requesting that a device be associated with a particular name or role, the process may determine which device the user intended to provide this command to.

DETAILED DESCRIPTION

Figure 1:
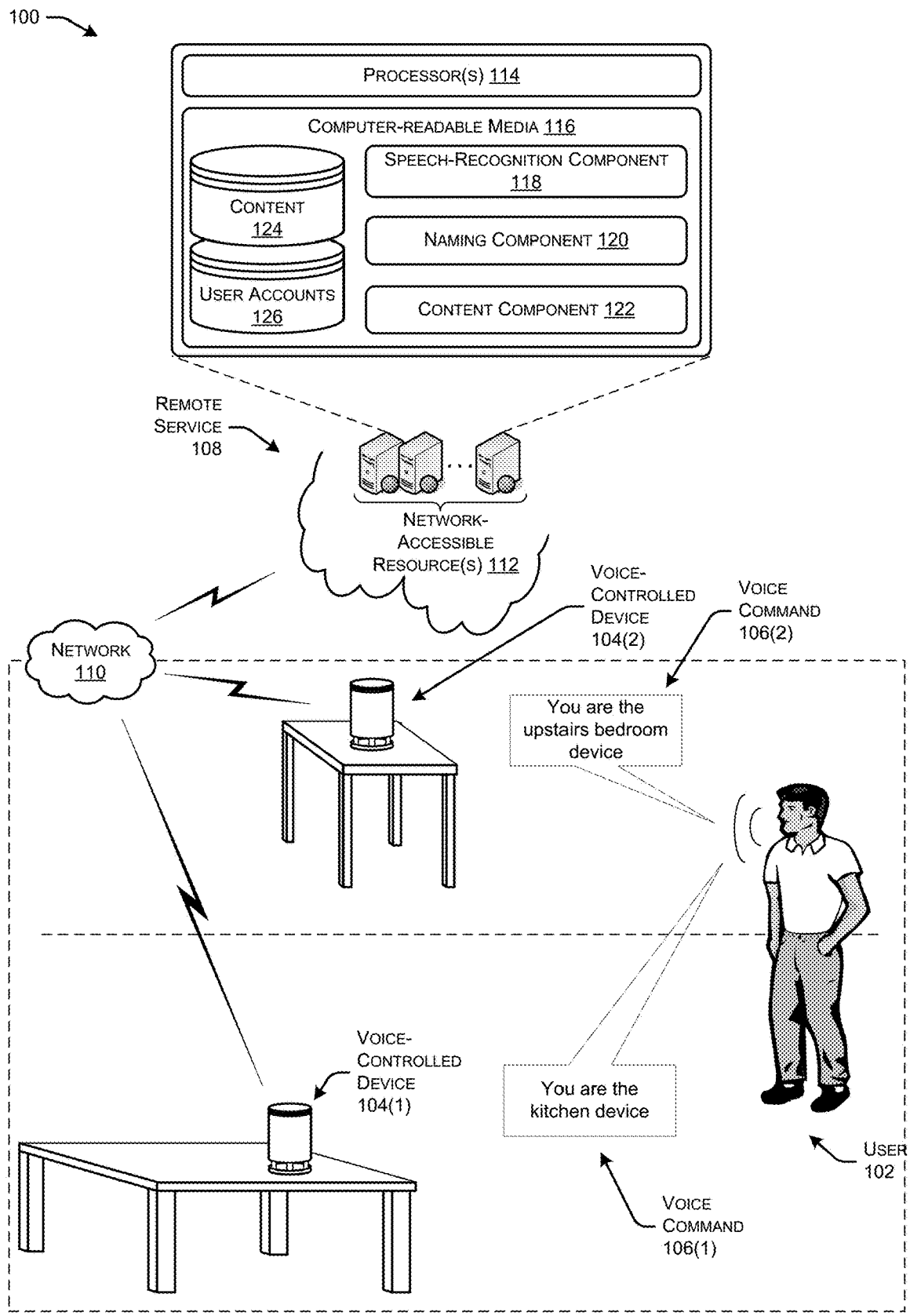
FIG. 1 is a schematic diagram of an illustrative environment in which a user issues a first voice command to a first device and a second voice command to a second device, the voice commands requesting to assign different names to the respective devices.

Techniques for allowing users to associate functional identifiers (e.g., names or roles) with devices via voice commands are described herein. For instance, a voice-controlled device may generate an audio signal based on sound detected within an environment, with the audio signal representing a voice command to associate a particular functional identifier with the voice-controlled device. In response to generating this audio signal, the voice-controlled device may perform speech recognition on the audio signal to identify the voice command or may send the audio signal to a remote service for doing so. Upon receiving the audio signal, the remote service may perform the speech recognition and may identify the voice command. For instance, the remote service may determine that the audio signal includes a first portion indicating that the user is going to provide a functional identifier for the device (e.g., "You are . . . ", "I will call you . . . ", "Your name is . . . ", etc.) and a second portion corresponding to the functional identifier (e.g., " . . . my kitchen device", "my upstairs speaker", etc.).

To identify the first portion, the remote service may be programmed to identify one or more predefined phrases, such as "you are". After identifying the first portion and identifying the second portion, the remote service (in this example) may store the second portion in association with an identifier of the device. To illustrate, envision that a user states, to a voice-controlled device, "You are my kitchen device". After generating an audio signal that includes this command, the voice-controlled device may provide this audio signal to the remote service. Upon receiving the audio signal, the remote service may perform speech recognition on the audio signal to generate the text "You are my kitchen device." The remote service may parse this text to identify the predefined phrase "You are", which may be associated with a domain for naming devices. As such, after identifying the predefined phrase, the remote service may store the subsequent portion of the text in association with an identifier of the device (e.g., a MAC address, Internet Protocol (IP) address, etc.). That is, the remote service may store the functional identifier specified by the user in association with an identifier of the voice-controlled device that is typically immutable by the user. As illustrated by the examples below, the functional identifier may be based on the user's interaction with the device and may be used to optimize the device for the particular usage of the device desired by the user, as opposed to the identifiers of the device that are generally immutable by the user, such as the MAC address, IP address, or the like.

Here, the remote service may store the phrase "kitchen device" or "my kitchen device" in association with the identifier of the device. In addition, this functional identifier (e.g., name or role) may be used to enhance certain functionality of the device. For instance, a device labeled with the word "kitchen" may be configured via speech-recognition software to remove noise associated with running water or other sounds associated with activities traditionally performed in the kitchen. A device entitled "my kitchen television" may be configured to provide recommendations or the like aimed at these kitchen activities (e.g., recommendations for cooking shows, etc.), while a device named "the living room television" might not.

Thereafter, in the instant example the user may provide one or more commands to the voice-controlled device. For instance, envision that the user states the following: "Please play the Beatles on my kitchen device". After generating an audio signal that includes this command, the voice-controlled device may perform speech recognition on the signal or may send the signal to the remote service. The remote service may perform speech recognition on the audio signal to generate corresponding text and may analyze the text to identify the request to play the Beatles "on my kitchen device". For instance, the remote service may identify a word or phrase associated with a music domain, may identify the requested music (music associated with the Beatles), and may identify the device on which the user has requested to play the music (" . . . my kitchen device"). After identifying this information, the remote service may obtain the appropriate content (or instructions for playing the content) and send the content to the device associated with an account of the user and associated with the name "kitchen device." Upon receiving the content, the voice-controlled device may play the requested music.

Sometime thereafter, the user may desire to rename (i.e., associate a new functional identifier with) his device. For instance, envision that the user moves the device from the kitchen to a bedroom of the user. As such, the user may issue a voice command "You are the upstairs bedroom device". Upon the device generating an audio signal and sending the audio signal to the remote service, the remote service may perform speech recognition to generate corresponding text. The remote service may then analyze the text to identify the predefined phrase "You are". In response, the remote service may map this phrase to domain associated with naming an application. Again, the remote service may then identify the text subsequent to the predefined phrase, with this section portion of text here being "the upstairs kitchen device". In response to identifying this text, the remote service may replace the name "kitchen device" with "upstairs device" or "my upstairs device". As such, the user may later cause the device to perform operations by sending, to the voice-controlled device or other devices, a request to perform an operation by "the upstairs device". Of course, while the above examples describe naming or re-naming a device using voice commands, in some instances a user may need to be authenticated and/or authorized to associate a name with a device. For instance, a user profile at the remote service or the local device may store an indication of those users who are able to rename the device. The device or remote service may therefore request that the user authenticate prior to the functional identifier being given to the device. This authentication process may include a user providing a user name and/or password, an answer to a previously provided question, biometric information, and/or any other type of authentication information.

In addition to storing the functional identifier of the device, in some instances the remote service may be configured to identify one or more qualifiers from the audio signals and store these qualifiers in association with the respective devices. These qualifiers may comprise location qualifiers, device-type qualifiers, or the like. For instance, in the first example above, the user requests to name a device "my kitchen device". In response to identifying this request, the remote service may identify the location qualifier "kitchen" and may store this qualifier in association with the device. Therefore, the user may later be able to control this device, and potentially other devices associated with this same location qualifier, by requesting to perform an operation on devices associated with this qualifier. For example, the user may provide a voice command to "turn off all my devices in the kitchen". In response to identifying the requested operation ("turn off") and the location qualifier ("kitchen"), the remote service may identify any devices that are associated with this location qualifier, including the example device. The remote service may then send a request to each of these devices to change their state to off, if in fact they are currently powered on.

In addition to a location qualifier, the remote service may be configured to identify one or more device-type qualifiers representing different types of devices. Device types may include televisions, set-top boxes, gaming counsels, smart light bulbs, cameras (for, e.g., home, security, personal and/or active use), stereo components, alarm system sensors, temperature sensors, smart door locks, other home sensors, online shopping buttons, eReaders, tablet computers, automobiles, lap top computers, desktop computers, mobile phones, home appliances (e.g., refrigerators, coffee machines, washing machines, etc.), office appliances (e.g., printers, security access points, point-of-sale registers, RFID terminals, credit card readers, etc.), door types (e.g., garage door, back door, front door, etc.), sensors (e.g., living room thermometer, front door sensor, bedroom window sensor, front yard rain sensor, etc.), thermostats, vehicles (e.g., a microphones/speaker/Bluetooth combination within a user's car), or other voice-controlled devices. For instance, a user may provide a voice command stating: "You are my downstairs television". In this example, the remote service may identify both a location qualifier ("downstairs") and a device-type qualifier ("television"). This may occur even when the device hearing the command is not a television, but is instead, for example, a set-top box or other type of media streaming device (e.g., tablet) communicatively coupled to a display (e.g., television). As such, the user may be able to control this device (and other devices associated with an account of the user at the remote service) by providing a voice command to perform an operation on a particular device type (e.g., "turn all of my televisions on to channel 8").

In some instances, prior to a voice-controlled device sending an audio signal to the remote service, the voice-controlled device may determine that the user has uttered a predefined word or phrase. That is, the voice-controlled device may perform speech recognition on audio signals generated with the environment of the voice-controlled device, but may not send these audio signals to the remote service until identifying the predefined word or phrase. For example, if the predefined word or phrase is "wake up", the voice-controlled device may begin sending the audio signal to the remote service in response to identifying the phrase "wake up". In the above example, the user may state the following: "Wake up . . . you are now my kitchen device". In response to performing speech recognition on the audio signal to identify the phrase "wake up", the voice-controlled device may begin sending an audio signal to the remote service for further speech recognition. The remote service may thus identify the request to name the device "my kitchen device" and may store this name in association with the identifier. Further, while the above example describes the voice-controlled device sending the audio signal to the remote service in response to the voice-controlled device identifying a predefined word or phrase, the device may do so in response the user selecting a physical button on the device or the like.

In addition, the techniques described herein allow a user to assign one or more roles to devices via voice commands. As used herein, a name of a device represents a word, phrase, or other utterance that may be associated with a device such that a user may later control the device in part by stating this word, phrase, or utterance. A role, meanwhile, may represent, at least in part, functionality to be performed by the device. In some instances, a name of a device specifies a role, while in other instances a name may simply represent a way to interact with a device. For instance, a device may be named "the kitchen device" and users may therefore interact with the device by providing commands to the kitchen device (e.g., "play music on the kitchen device"). In addition, in some instances the name "the kitchen device" may result in enhancing or altering functionality of the device, given that the name includes the word "kitchen" as described below. That is, the name "the kitchen device" may map to a role associated with devices in kitchen environments, and thus the functionality of the device may be modified, such as in the example ways discussed below.

To provide another example, in one instance a user may acquire multiple voice-controlled devices to create a multi-channel audio system (e.g., a 5.1 or 7.1 surround sound system). After powering on a first of these devices, the user may state the following voice command: "You are the front-right speaker". The voice-controlled device may send a generated audio signal that includes this voice command to the remote service, which may perform speech recognition thereon to identify the intent to associate the device with a particular role. That is, the remote service may identify the first part of the voice command ("You are") and may identify a type of role that the remote service has been configured to identify ("front-right speaker"). As such, the remote service may store an indication of this role in association with an identifier of the device.

In addition, upon powering on a second voice-controlled device, the user may state the following command: "You are the front-left speaker". Again, the remote service may send this audio signal to the remote service, which may identify the request to associate the role ("front-left speaker") with the device. The remote service may then store this role in association with an identifier of the device.

Thereafter, the remote service may utilize the different roles of the devices. For instance, if the user requests to output content that includes audio content, then remote service may identify a first portion of content to be output on the front-right speaker and may send this first portion of content to the first device. In addition, the remote service may identify a second portion of content to be output by the front-right speaker and may send this second portion of content to the second device. The remote service may also send additional audio content to additional channels of the multichannel audio system (e.g., the center channel, the surround-left channel, the surround-right channel, etc.) as well as send visual content to a display device (e.g., a television). In other instances, the remote service may send the audio/visual content to a single device within the environment, which may distribute the content to the different audio channels and/or display devices.

While the above example describes one example role in terms of a particular channel of a multichannel audio system, the techniques may assign an array of other types of roles with devices. For instance, a user may request that a voice-controlled device function as a baby monitor. In response, the remote service may send an instruction informing the device or its role. In this example, the remote service may send, to the device playing the role of baby monitor, an indication that the device is to monitor the environment for audio having characteristics exhibited by the crying sound of a baby. Further, the remote service may send an indication that the device is to output certain audible content in response to identifying a baby crying. Of course, multiple other roles are possible, such as requesting that a device having a camera operate as a surveillance system, a device having a microphone operate as a recording device, or the like. In some instances, a role may be associated with one or more capabilities of a device. For example, if the role of "speaker" may be associated with a capability of outputting sound, but not with the capability of outputting video or other visual content. As such, if a user states a command that a device having a display is to operate as a speaker (e.g., "You are now my downstairs speaker"), then remote service may send an indication of at least one function of the device to disable while the device is associated with the role. Here, for example, the remote service may send an instruction to disable the display of the device. Alternatively, if the user request that a device be associated with a role that is associated with the display of content (e.g., "You are my downstairs television"), the remote service may send an indication to the device to enable the function of displaying content on the display of the device.

In some instances, an environment may include multiple voice-controlled devices. Here, multiple devices may in some instances generate audio signals that correspond to common sound, such as a voice command to associate a device with a particular name or role. For instance, envision that an environment includes two voice-controlled devices and that a user states the following command in the environment: "You are my kitchen device". In response to detecting this sound, the first voice-controlled device may generate a first audio signal and the second voice-controlled device may generate a second audio signal. Each of these devices may send their respective audio signals to the remote service, which may perform speech recognition on both signals to determine that both signals represent the same voice command.

In response, the remote service may attempt to determine which device the user was speaking to. To do so, the remote service may compare at least one characteristic of the first audio signal to a corresponding at least one characteristic of the second audio signal. For instance, the remote service may compare a first amplitude (i.e., volume) of the voice command in the first audio signal to a second amplitude of the voice command in the second audio signal. The remote service may then determine that the device that provided the audio signal having the voice command of the greatest amplitude is to the device to be associated with the name or role, given that the user was most likely nearer that device. In response, the remote service may associate that the name or role with an identifier of the selected device. In addition, the remote service may send an indication of the device associated with the name or role, along with an instruction to output audio and/or visual content to the selected device such that when the device outputs the content the user is notified as to which device has been associated with the name or role. To provide an example, if the first of the two voice-controlled devices is selected as "my kitchen device", then remote service may send an instruction to the first device to output an audible beep, to illuminate a light of the device, or the like.

Of course, while the above example describes determining which of two devices to associate with a specified name or role, it is to be appreciated that any number of devices may generate audio signals corresponding to a common voice command, with the remote service selecting one or more of these devices to associate with the name or role. Further, while the above example describes comparison of audio amplitudes to determine which device the user was speaking to, in other instances the remote service may compare any other types of characteristics to the audio signals to make this determination, such as frequencies of the audio signals, estimated directions of a user relative to the devices, a signal-to-noise (SNR) of the audio signals or the like. Furthermore, while the above example describes the analysis being performed by the remote service, it is to be appreciated that one or more of the devices may perform this analysis. For instance, a first device within the environment may generate a first audio signal and may receive one or more other audio signals from other devices in the environment that also generated audio signals at a common time. The local device may then compare one or more characteristics of the audio signals to one another to determine which of the devices the user intended to associate the name or role with. In response to identifying the device, the local device may send an indication to the remote service, which may store the appropriate name or role in association with the identified device.

In addition to the above, the techniques described herein include determining when a device is first powered on or when the device connects to a new network and, in response, whether the device is current associated with a name or role. If the device is not yet associated with a name or role, the techniques may include outputting, via the device or another device, a request to provide a name or role for the device. If the device is determined to already be associated with a name or role the techniques may determine the applicability of the name or role and, in response to determining that the name or role is no longer applicable, may suggest creation of a new name or role.

For instance, when a device connects to a network, the device may be configured to send an indication along with an identifier of the device to the remote service. In response to receiving the indication, the remote service may determine, using the identifier, whether a name (or role) has previously been associated with the device. If it is determined that the device has not been associated with a name (or role), then the remote service may send an audio signal for output on the device, with the audio signal representing a request to provide a name or role for the device. In response to the device generating an audio signal from detected sound, the device may send this audio signal to the remote service, which may perform speech recognition on the signal to identify a response of a user. After identifying text from the speech recognition, the device may then associate at least a portion of this text as a name (or role) of the device. If, however, the remote service determines that the device has previously been associated with a name or role, then the remote service may send an audio signal for output on the device indicating the name and comprising a query as to whether the user would like to rename the device or give the device a new role.

In some instances, the remote service may perform the above analysis in response to occurrence of one or more predefined events. For instance, the remote service may perform this analysis in response to the device connecting to a particular network for a first time or in response to the device connecting to a first network after previously being connected to a second network, regardless of whether or the not the device has at some point in time previously connected to the first network. For instance, the remote service may receive an identifier (e.g., name, access point ID, etc.) of the network to which the device has connected. In response, the remote service may access database data associated with the device indicating which network(s) the device has previously connected with. In response to determining that the device has not previously connected with the particular network, the remote service may perform the analysis discussed above. Further, the remote service may update the database data to indicate that the device has not connected to this network. Furthermore, in instances where a user utilizes a second device to configure the device (such as in the case of the second device executing a companion application that allows the user to control the device), the remote service may receive some or all of the information regarding whether the device has previously connected to the particular network via the companion application.

In other instances, the remote service may perform this analysis in response to the device being powered off and then back (e.g., unplugged from a power source and plugged back in). In other instances, the remote service may perform this analysis in response to a wireless network strength changing by more than a threshold amount, in response to the device detecting new short-range wireless signals (e.g., from other devices), in response to a short-range wireless signal strength changing by more than a threshold device, or the like. Additionally or alternatively, the remote service may perform this analysis periodically.

To provide an example, envision that a user positions a voice-controlled device and connects the device to a first network. In addition, envision that the user requests that the remote service assign a first name (e.g., "my kitchen device") to the device. In addition, when positioned at this location, the voice-controlled device may detect one or more short-range wireless networks (e.g. via Bluetooth, Zigbee, etc.) and store an indication of the name of those networks and a corresponding signal strength. For instance, the voice-controlled device may identify a short-range wireless network from a refrigerator within the environment.

Later, a user may move the voice-controlled device to a new position within the environment or to an entire new environment (e.g., to a workplace of the user). When the user powers on the voice-controlled device, the voice-controlled device may couple to a new network (e.g., a new WiFi network), and may also sense one or more short-range wireless networks (e.g., a printer in the office). The voice-controlled device may then send its identifier to the remote service, potentially along with the names and/or signal strengths of the new wireless and short-range wireless networks. The remote service may determine, using the identifier of the device, that the device has already been given a name ("my kitchen device"), and may make a determination regarding the current applicability of the name.

To do so, the remote service may calculate an applicability score and may determine whether this score is greater or less than a threshold. The applicability score may be based on an array of criteria, such as whether the voice-controlled device is connected to a new network, whether the voice-controlled device senses short-range wireless networks from new devices (e.g., the printer instead of the refrigerator), the names and capabilities of the devices surrounding the voice-controlled device, and the like. For instance, the applicability score for a previous name may be higher if the voice-controlled device is still connected the same network as it previously was, yet with a lesser strength, than if the voice-controlled device is connected to an entirely new network.

Upon calculating the applicability score, the remote service may compare this score to the applicability threshold. If the score is greater than a threshold, the remote service may determine that the name (or role) is still applicable. In some instances, the remote service may still send an audio signal for output by the voice-controlled device, asking the user to confirm whether the name is still applicable. If, however, the applicability score is less than the threshold, then the remote service may determine that the name (or role) might not be applicable. As such, the remote service may send an audio signal for output by the voice-controlled device, querying the user as to a new name or role of the device. In some instances, the remote service may assign a default name or role if the previous name or role is determined not to be applicable, or may assign a name or role to the device based on names or roles of devices determined to be proximate to the voice-controlled device. In still other instances, the remote service may suggest a name or role to be assigned to the voice-controlled device.

While the above describes the techniques as being performed by one or the other of a client device or the remote service, it is to be appreciated that in other instances the techniques described herein may be performed by either or both of client devices or a remote service. Further, while the following description describes assigning functional identifiers to devices in the terms of names or roles, it is to be appreciated that a functional identifier may include a name, a role and/or any other customer-specific information that causes a respective device to function in a particular manner relative to the device's default or previously-set configuration. Further, each discussion below of assigning a name to a device may be applicable to assigning a role or other functional identifier to a device, and vice versa.

FIG. 1 is a schematic diagram of an illustrative environment in which a user 102 issues a first voice command 106(1) ("You are the kitchen device") to a first voice-controlled device 104(1) and a second voice command 106(2) ("You are the upstairs bedroom device") to a second voice-controlled device 104(2), the voice commands requesting to assign different names to the respective devices. The sound waves corresponding to these natural language command 106 may be captured by one or more respective microphone(s) of the voice-controlled devices 104. In some implementations, the first voice-controlled device 104(1) may generate a first audio signal and may process this first signal, while the second voice-controlled device 104(2) may generate a second audio signal and may process this second signal. In other implementations, some or all of the processing of the sound may be performed by additional computing devices (e.g. servers) of a remote service 108 connected to the voice-controlled devices 104 over one or more networks. For instance, in some cases the voice-controlled device 104 is configured to identify a predefined "wake word" (i.e., a predefined utterance). Upon one or the devices identifying the wake word, the respective voice-controlled device may begin uploading an audio signal generated by the device to the remote service 108 for performing speech recognition thereon, as described in further detail below.

Regardless of whether the speech recognition is performed locally or remotely, the first voice command 106(1) may result in the first device 104(1) being assigned the first name ("the kitchen device"), while the second voice command 106(2) may result in the second device 104(2) being assigned the second name ("the upstairs bedroom device"). As such, the user (or other users) may be able to control these devices using their respective names. For instance, the user may request "play music on the kitchen device" or to "place a phone call to Jerry on the upstairs bedroom device". As described in further detail below, the devices and/or the remote service 108 may identify the requested operations, as well as the names of the devices, and may cause the respective devices to perform the requested operations.

FIG. 1 illustrates that the voice-controlled device 104 may couple with the remote service 108 over a network 110. The network 110 may represent an array or wired networks, wireless networks (e.g., WiFi), or combinations thereof. The remote service 108 may generally refer to a network-accessible platform—or "cloud-based service"—implemented as a computing infrastructure of processors, storage, software, data access, and so forth that is maintained and accessible via the network 110, such as the Internet. As such, the remote service may comprise one or more devices, which collectively may comprise a remote device. Cloud-based services may not require end-user knowledge of the physical location and configuration of the system that delivers the services. Common expressions associated with cloud-based services, such as the remote service 108, include "on-demand computing", "software as a service (SaaS)", "platform computing", "network accessible platform", and so forth.

As illustrated, the remote service 108 may comprise one or more network-accessible resources 112, such as servers. These resources 112 comprise one or more processors 114 and computer-readable storage media 116 executable on the processors 114. The computer-readable media 116 may store a speech-recognition component 118, a naming component 120, and a content component 122, as well as a datastore 124 of content (e.g., books, movies, songs, documents, etc.) and a datastore 126 storing details associated with user accounts, such as a user account associated with the user 102. Upon one of the devices 104, such as the first device 104(1) identifying the user 102 speaking the predefined wake word (in some instances), the device 104(1) may begin uploading an audio signal representing sound captured in the environment 100 up to the remote service 108 over the network 110. In response to receiving this audio signal, the speech-recognition component 118 may begin performing automated speech recognition (ASR) on the audio signal to generate text and identify one or more user voice commands from the generated text.

In the illustrated example, for instance, the voice-controlled device 104(1) may upload the first audio signal that represents the voice command 106(1), potentially along with an identifier of the device 104(1) (e.g., a MAC address, IP address, etc.). The speech-recognition component may perform ASR on the first signal to generate the text, "You are the kitchen device". The naming component 120, meanwhile, may utilize natural-language-understanding (NLU) techniques to analyze the text to determine that a first portion of the first audio signal includes the phrase "you are", which the naming component has been previously configured to identify. In this example, this predefined phrase may represent one of one or more predefined phrases used to indicate that a user is going to provide a name or role of a device. Other example, non-limiting phrases may include "you are now", "your name is", "I will call", and the like.

After identifying the phrase "you are", the naming component 120 may be configured to store some or all of subsequent text in association with an identifier of the device 104(1) (e.g., as its name or role). Here, the naming component 120 may determine that a second portion of the text, subsequent to the first portion, includes the text "the kitchen device". As such, the naming component may store, in the user-account datastore 126, the text "the kitchen device" in association with the identifier of the first voice-controlled device 104(1). Therefore, the user 102, and other users within the environment, may be able to control the first voice-controlled device 104(1) via the name "the kitchen device".

Similarly, the user may issue the voice command 106(2) "You are the upstairs bedroom device" to the voice-controlled device 104(2). The device 104(2) may upload the second audio signal including this command, and the naming component 122 may identify the request to name the device. Again, the naming component 122 may store this text ("the upstairs bedroom device") in association with an identifier of the device 104(2). Therefore, the user 102 may be able to control this device 104(2) via its name.

For instance, envision that the user 102 later issues a voice command to, to the second device 104(2), to "play music on the kitchen device" after stating the predefined word or phrase (i.e., the wake word). Upon receiving an audio signal corresponding to this voice command, as well as receiving an identifier of the second device 104(2) that sent the audio signal, the speech-recognition component 118 may generate the text "play music on the kitchen device". The naming component 120, meanwhile, may reference the user-account datastore 126 to identify the user account to which the device 104(2) is registered. That is, the component 120 may map the identifier of the device 104(2) to the account of the user 102. Once the appropriate user account has been located, the naming component may identify which device is associated with the name "the kitchen device". The naming component 120 may provide the identifier of this device, device 104(1), to the content component 122.

The content component 122, meanwhile, may also receive the generated text from the speech-recognition component 118 and may recognize, from this text the command to "play music". Potentially after determining the type of music the user 102 wishes to play (e.g., via a back-and-forth dialog with the user 102), the content component may send music from the content datastore 124 for output on the voice-controlled device 104(1) using the received identifier of the device 104(1). While FIG. 1 illustrates the remote service 108 as containing the content 124, in other instances a third party may provide the music or other content and, thus, the content component 122 may send an instruction to the appropriate third party to send the content to the identifier associated with the device 104(1).

Furthermore, upon the remote service identifying that the user has requested to name the first device "the kitchen device", the naming component 120 may determine whether some or all of the text "the kitchen device" is associated with predefined text associated with respective roles. For instance, the naming component 120 may determine that the text "kitchen" or "kitchen device" is associated with a role that is associated with certain functionality. For instance, the naming component 120 may determine that devices that are named with a name that includes the term "kitchen" are to implement noise-cancelation techniques for sounds often heard in the kitchen, such as running water, the sound of a garbage disposal or the like. The naming component 120 may therefore send an instruction to the first device 104(1) to implement (or disable) the functionality associated with the role. For instance, the naming component 120 may send an instruction to filter out sounds corresponding to the common kitchen sounds, in addition to audio signatures for use in performing the filtering (e.g., an audio signal associated with the sound of running water, an audio signal associated with the sound of a garbage disposal, etc.).

After the user 102 has named the devices 104(1) and 104(2), the user may at some point decide to rename one or both of these devices. For instance, envision that the user 102 moves the first device 104(1) from the kitchen to his office. The user may then provide a voice command stating: "you are now the office device". Again, the device may upload an audio signal to the remote service 108, which may identify the request to change the name. As such, the naming component 122 may replace, for the identifier of the device 104(1), the text "the kitchen device" with the text "the office device". The user 102 may thereafter be able to control the device 104(1) using the name "the office device".

In addition to storing the name of the devices 104(1) and 104(2), the naming component 122 may identify one or more qualifiers, such as location qualifiers, device-type qualifiers, and the like. To do so, the naming component may be programmed with predefined location qualifiers (e.g., "upstairs", "downstairs", "bedroom", etc.) and device-type qualifiers (e.g., "voice-controlled device", "television", "telephone", etc.). In the example above, the naming component 122 may identify the location qualifiers "upstairs" and "bedroom", and may store these in association with the identifier of the device 104(2) in the user-account datastore 126.

As such, the user 102 may be able to control multiple devices by providing voice commands requesting operations to be performed upon devices having certain qualifiers. For instance, the user 102 may issue a voice command to "turn off all of my upstairs devices". In response, the naming component may identify the devices having this location qualifier and may send an instruction to each device to perform the requested operation. Further, the user may issue a voice command to perform an operation to each device associated with a particular device type. For instance, the user 102 may issue a voice command to "turn all of my televisions to channel 2". In response, the naming component 122 may identify those devices associated with the device-type "television" and may send an instruction to each of these devices to perform the requested operation.

In still other instances, the devices 104 and/or the remote service 108 may identify a predefined occurrence and, in response, may determine whether to suggest the naming of a device, suggest renaming of a device, or the like. For instance, upon the device 104(1) first connecting to a wireless network, the device 104(1) may send an indication of this connection to the remote service 108. The remote service may then use the identifier to identify the user account and, from the account, to determine whether the device has already been named (or associated with a role). If not, then the remote service may send data for output on the device or another device requesting whether the user would like to give the device a name. The device may output this query audibly, visually, or the like. In some instances, the remote service 108 provides a suggestion of a name based on one or more criteria, such as other devices that are proximate to the device (e.g., kitchen devices, office devices, etc.). If, however, the remote service 108 determines that the device has already been associated with a name, the remote service 108 may determine whether the name is still applicable. If so, the remote service 108 may maintain the name. If, however, the name is determined as potentially inapplicable, then the remote service 108 may issue a query regarding whether the user would like to rename the device. In some instances, current applicability of a name may be based on whether the device has likely moved since the time it was named, as determined with regard to whether the device now connects to a different network, is proximate to different devices, based on signal strength changes to these networks or devices, or the like. In some instances, the potential renaming process may occur in response to the device connecting to a new network, based on a signal strength changing by more than a threshold amount, based on the device being removed from a power source (and subsequent re-plugged to a power source), or the like.

In still other instances, more than one device may generate an audio signal based on a common voice command. For instance, envision that both the voice-controlled device 104(1) and the voice-controlled device 104(2) generates an audio signal based on sound corresponding to the voice command: "You are the kitchen device". In this situation, the devices 104 and/or the remote service 108 may attempt to determine whether the user was speaking to the first voice-controlled device 104(1) or the second voice-controlled device 104(2). This analysis may be performed locally on one or more of the devices 104, remotely at the remote service 108, or a combination thereof.

For instance, the first voice-controlled device 104(1) may upload its audio signal including this voice command to the remote service 108, while the second voice-controlled device 104(2) may do the same. The remote service 108 may compare one or more characteristics of these audio signals to determine which device is to be named "the kitchen device". For instance, the remote service 108 may compare an amplitude (i.e., a volume) of the first audio signal to an amplitude of the second audio signal. The remote service 108 may then designate the audio signal having the greater amplitude as the device to associate the name with, based on the assumption that the user 102 was likely speaking more closely and/or directly to that particular device. In addition or in the alternative, the remote service 108 may compare a signal-to-noise (SNR) ratio of the first audio signal to an SNR of the second audio signal, a time at which each device generated their respective portions of their audio signals corresponding to the commands, or any other characteristic when determining which device to which the user directed the command. The remote service 108 may then send an indication to the device having been named "the kitchen device" indicating that it has been named as such.

As mentioned above, in some instances the devices 104(1) and 104(2) may work in unison to determine which device the user directed the voice command to. For instance, the first device 104(1) may provide its first audio signal to the second device 104(2), which may perform the comparison of the one or more characteristics discussed above. After determining which device the user 102 was speaking to, the voice-controlled device 104(2) may send a corresponding indication to the voice-controlled device 104(1) and/or the remote service 108.

Figure 2:
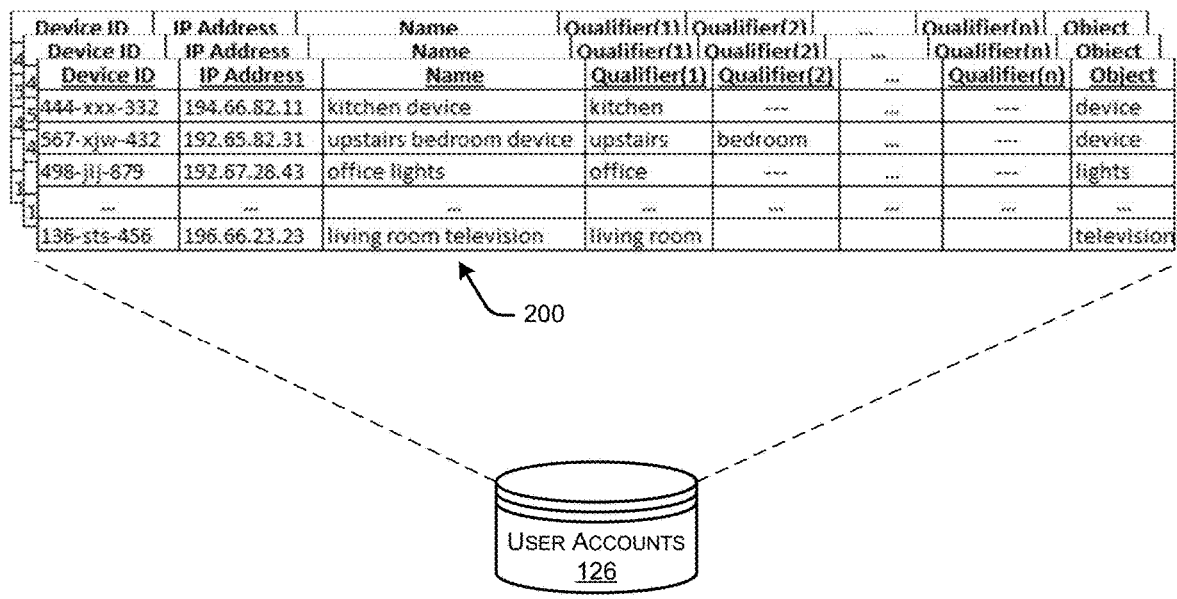
FIG. 2 illustrates example details that a remote service may store in association with an account of the user at the remote service, including names of devices associated with the user, thus allowing the user to control these devices via the names designated by the user.

FIG. 2 illustrates example details 200 that the remote service 108 may store in association with an account of the user 102 at the remote service 108, including names of devices associated with the user 102, thus allowing the user 102 and other users to control these devices via their respective names. As illustrated, the user-account datastore 126 may store multiple user accounts, each associated with one or more particular users. The stored details 200 may include one or more identifiers associated with devices of a particular user, such as the user 102. For instance, the datastore 126 may store MAC addresses, IP addresses, device serial numbers, or the like. In addition, the details include the names of the devices, if any, such as "kitchen device", "office lights", "living room television", or the like. In addition, the details 200 may store any location qualifiers specified in the name, as well as any device-type qualifiers (or "object") indicating the type of the device (e.g., lights, voice-controlled device, television, etc.).

Figure 3:
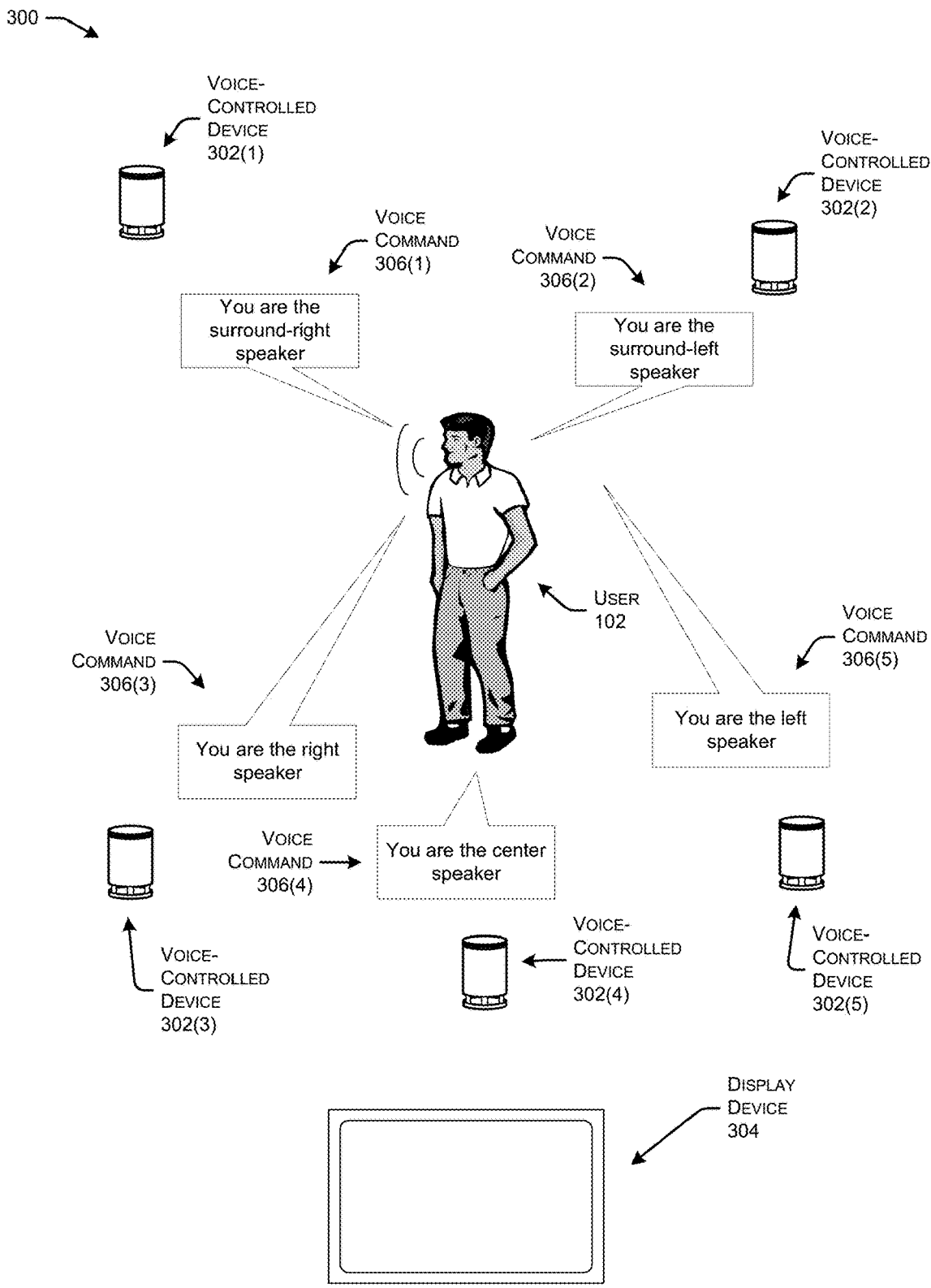
FIG. 3 is a schematic diagram of an example surround sound system. Here, the user uses voice commands to assign different channels to different devices in the surround sound system.

FIG. 3 is a schematic diagram illustrating configuration by voice of an example surround sound system 300. As illustrated, the system 300 includes voice-controlled devices 302(1), (2), . . . , (5), as well as a display device 304. Here, the user 102 uses voice commands 306(1), (2), . . . , (5) to assign different channels of a multichannel audio system to the different voice-controlled devices 306 in the surround sound system.

For instance, FIG. 3 illustrates that the user 102 issues the voice command 306(1) ("You are the surround-right speaker") to device 302(1), voice command 306(2) ("You are the surround-left speaker") to device 302(2), voice command 306(3) ("You are the right speaker") to device 302(3), voice command 306(4) ("You are the center speaker") to device 302(4), and the voice command 306(5) ("You are the left speaker") to device 302(5). In this instance, the first device 302(1) generates an audio signal that includes the voice command 306(1) and sends this signal to the remote service 108, while the second device 302(2) generates an audio signal including the voice command 306(2) and sends this signal to the remote service 108, and so forth.

In response to receiving the signal from the first device 302(1), the remote service 108 may identify the voice command 306(1) and may store an indication that the device 302(1) corresponds to the surround-right channel of the multichannel audio system. Similarity, the remote service may store an indication that the device 302(2) corresponds to the surround-left channel, and so forth. Therefore, when the user 102 later requests to output content on the system 300, the remote service 108 may send the content corresponding to the surround-right channel to the first device, the content corresponding to the surround-left to the second device, and so forth. The remote service 108 may also send the visual content to the display device. In other instances, the local devices 302 may store respective indications of their respective roles, and may share this information amongst components of the system 300, such that the devices 302 may output the appropriate channel-specific content when the user 102 utilizes local devices (e.g., the display device, a cable box, a digital versatile disks (DVD) player, etc.) to output content on the system 300.

Further, in some instances the remote service 108 may identify functionality associated with the assigned role of each voice-controlled device. For instance, when the naming component 120 of the remote service 108 generates the text from the audio signal corresponding to the voice command 306(1), the naming component may implement the NLU techniques to identify the command "You are" and the name "the surround-right speaker". The naming component 120 may then determine that the "surround-right speaker" is associated with a predefined role at the remote service 108, and that this predefined role is associated with certain functionality to achieve the role of "surround-right speaker". As such, the remote service 108 may send one or more instructions for implementing the functionality defined by the role of "surround-right speaker" (e.g., which portions of audio signals to output, etc.). Further, the naming component 120 may also determine the brand, type, or configuration of the voice-controlled device 302(1) to determine a configuration code for optimizing the device 302(1) to perform the assigned role of "surround-right speaker". The remote service 108 may then send a file including the configuration code to the device 302(1) such that the device 302(1) receives the file and performs the functionality specified by the configuration code. Further, the remote service may perform a similar process to configure each of the other voice-controlled devices 302(2)-(5) to perform their respective roles. In some instances, the naming component 120 may determine, based on the brand, type, model, or the like, that the remote service is not able to modify or optimize functionality of the device, and hence, may not send a configuration file to the device.

In some instances, meanwhile, a single device, such as the first device 302(1), may detect sound corresponding to multiple voice commands and, hence, may generate one or more audio signals that include multiple voice commands. For instance, the first device 302(1) may detect sound corresponding to each of the voice commands 306(1)-(5). Similarly, each other device 302(2)-(5) may detect the same. As such, the remote service 108, or the local devices, may be configured to determine which voice command corresponds to which device. As discussed above, for instance, envision that each of the devices 306(1)-(5) generates an audio signal that includes the voice command "You are the surround right speaker". The remote service 108, or a local device, may compare a characteristic of a first audio signal generated by the first device 302(1) to a corresponding characteristic of the additional audio signals generated by each of the devices 302(2)-(5). Based on this comparison, the remote service or the local client device may determine which device to assign as corresponding to the surround-right channel. In this example, it may be determined that the first audio signal has a largest amplitude amongst the audio signals, given that the user 102 was aimed at the first device 302(1) when speaking. As such, the first device 302(1) may be deemed as the surround-right channel in the system 300. The process may continue for each other voice command 306(2)-(5).

In addition, when a device is assigned a particular channel, the device may output audio and/or visual content to indicate this assignment. For instance, if the remote service 108 determines, after the user states the voice command 306(1), that the first device 302(1) is the surround-right channel, then the remote service 108 may send an instruction to the first device 302(1) to output a particular sound or illuminate a light, thus informing the user 102 that the first device 302(1) has been assigned the surround-right channel. This may repeat for each assignment of the five channels in this example.

FIGS. 4A-4D collectively illustrate a flow diagram of an example process 400 for using a first voice command to assign a name to a device, and thereafter issuing a second voice command for causing the device to perform a requested operation. The process 400 is illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In this example, the operations performed by underneath the voice-controlled device 104 may be performed by a local device, while the operations underneath the remote service 108 may be performed by this service. In the other processes illustrated and described herein, the operations may be performed locally in an environment, remotely, or a combination thereof.

At 402, the voice-controlled device 104 generates a first audio signal based on first sound. In this example, the first sound includes a voice command to assign a particular name to the voice-controlled device 104. While this process describes assigning a name to a device, it is to be appreciated that this process is equally applicable to assigning a role to a device. At 402, the voice-controlled device 104 sends the first audio signal to the remote service, which receives the first audio signal at 406. At 408, the remote service 108 performs speech recognition on the first signal to generate first text. At 410, the remote service 108 determines, from the text, that the user has requested to associate a name with the device. At 412, the remote service 108 stores this name in association with an identifier of the device 104, such that the user or other users may now control this device by referencing this stored name.

Figure 4A:
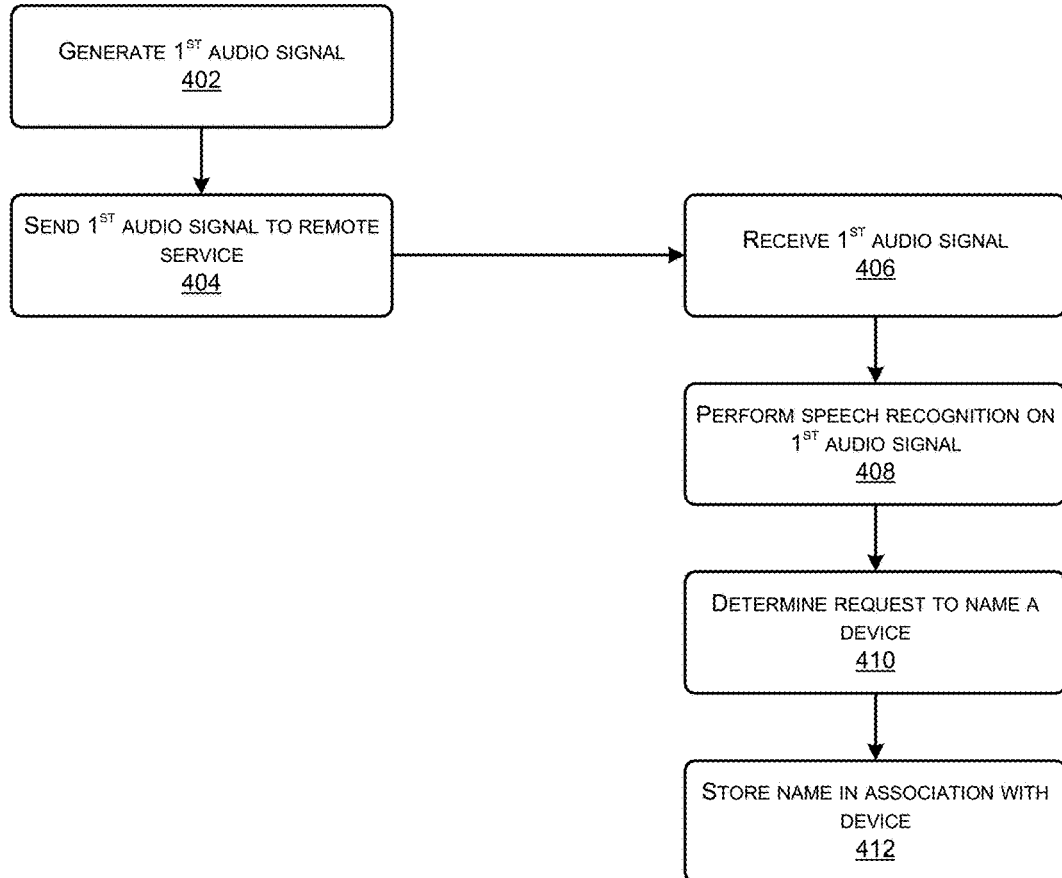
FIGS. 4A-4D collectively illustrate a flow diagram of an example process for using a first voice command to assign a name to a device, and thereafter issuing a second voice command for causing the device to perform a requested operation.
Figure 4A:
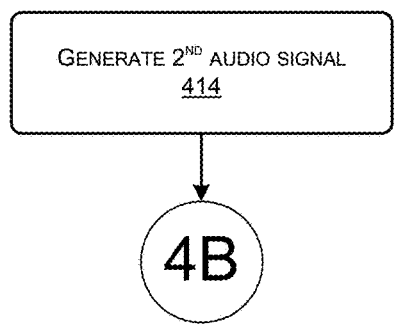
Figure 4B:
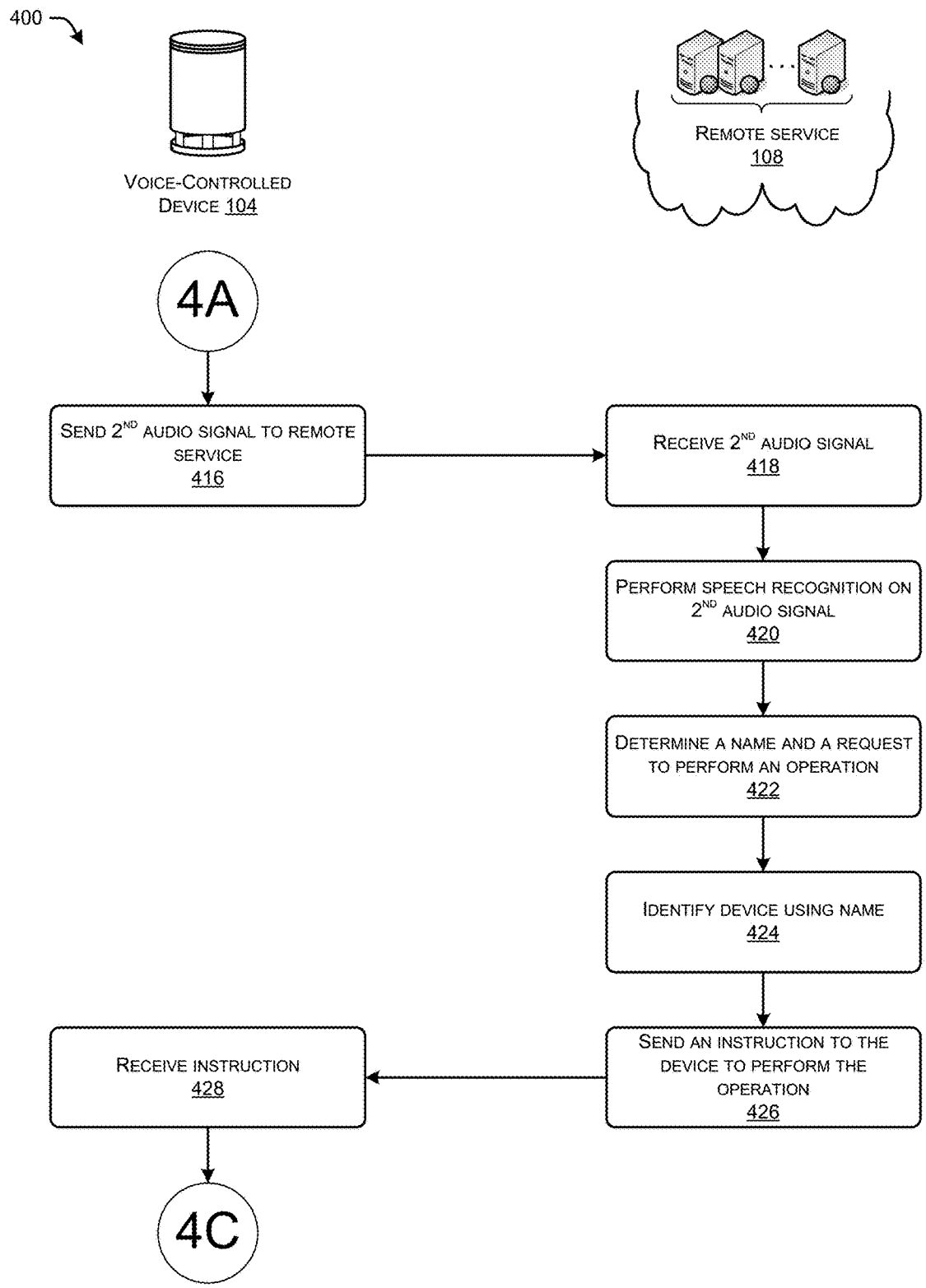
Figure 4C:
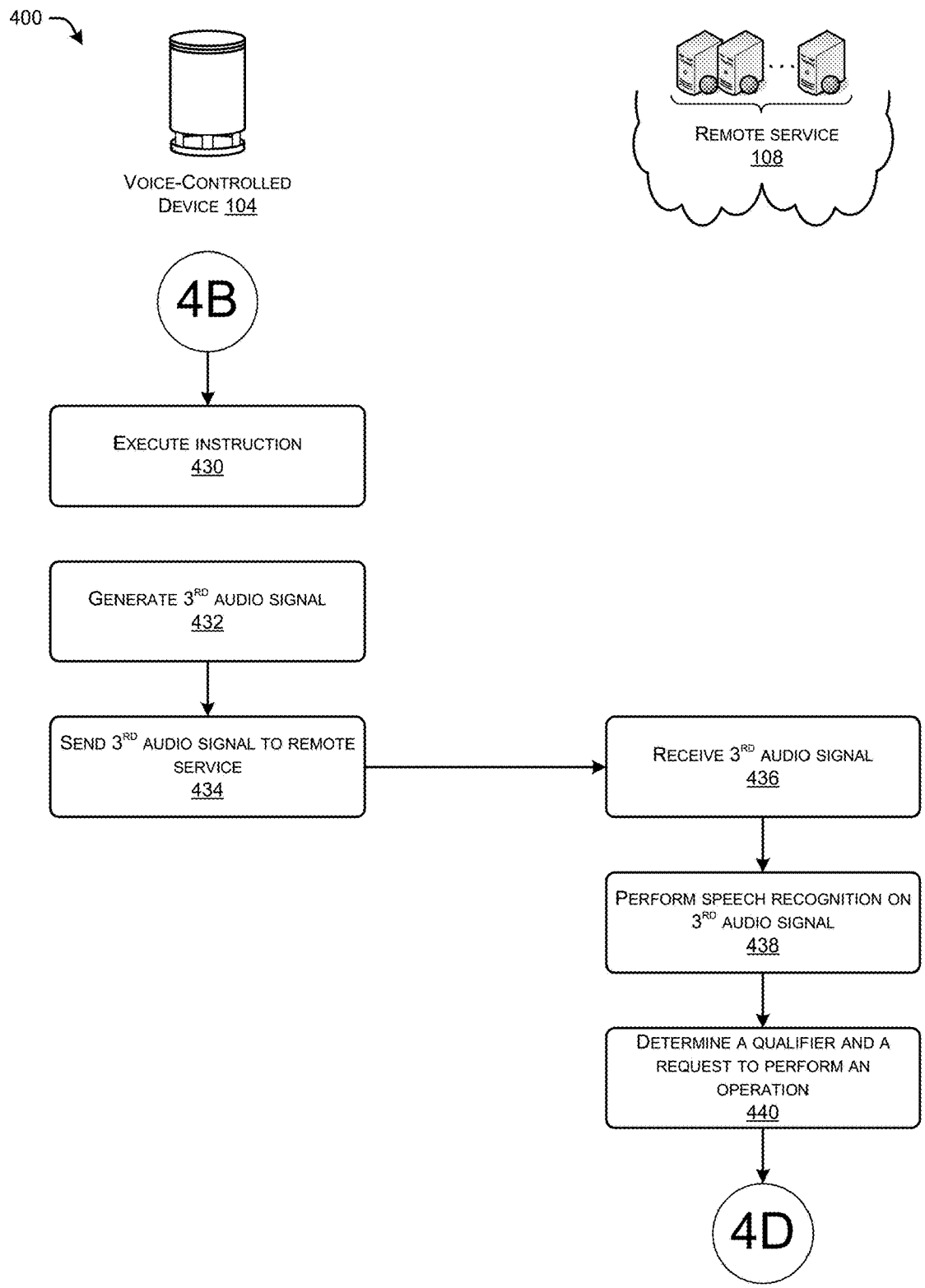

At 414, the voice-controlled device 104 generates a second audio signal based on detected second sound, which in this example includes a voice command instructing the named device to perform a certain operation. FIG. 4B continues the illustration and, at 416, the voice-controlled device 104 sends the second audio signal to the remote service 108. At 418, the remote service 108 receives the second audio signal and, at 420, performs speech recognition on the second audio signal to generate second text. At 422, the remote service 108 determines that the text includes a first portion reference a name of a device and a second portion requesting an operation. At 424, the remote service 108 identifies the device via the name. For instance, the remote service 108 may use an identifier received from the device that send the second audio signal to identify a user account, and may use the specified name in the second text to identify a particular device associated with the user account. In addition, at 424 the remote service 108 identifies a device identifier of the device associated with the name, to allow the remote service 108 to send an instruction to perform the operation. At 426, the remote service 108 sends the instruction to the device to perform the requested operation to the identified device.

At 428, in this example the voice-controlled device 104 receives the instruction, although in other examples the name referenced in the voice command may be a different device from which the audio signal is received and, hence, the remote service 108 may send the instruction to that different device. In any event, FIG. 4C continues the illustration of the process 400 and includes, at 430, the voice-controlled device 104 executing the instruction to perform the operation.

Figure 4D:
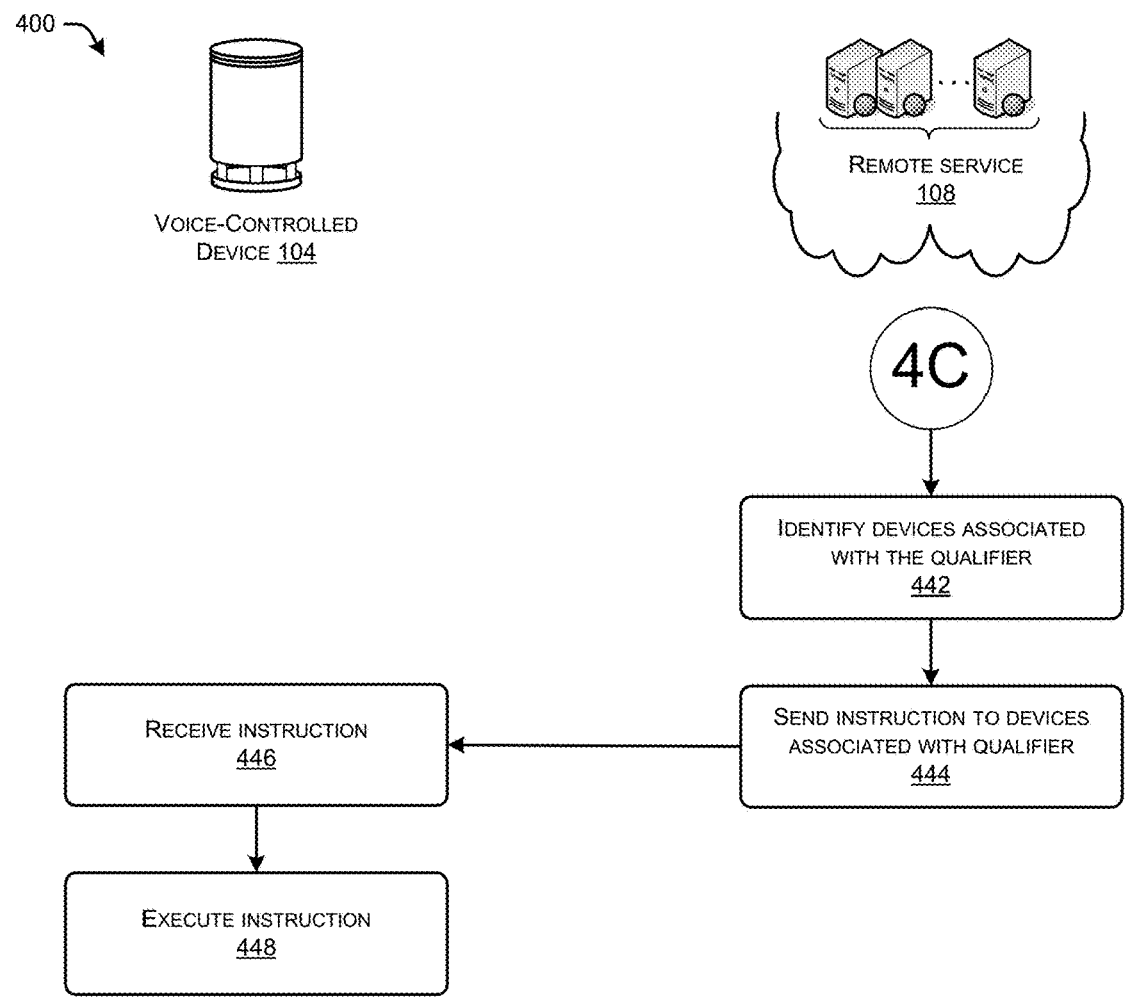

At 432, the voice-controlled device 104 generates a third audio signal based on detected third sound, which in this example includes a request that devices associated with a particular qualifier perform a specified operation. For instance, the voice command may comprise a request to "turn off my downstairs devices" or "play music on my upstairs devices". At 434, the voice-controlled device 104 sends the third audio signal to the remote service 108, which receives the third audio signal at 436. At 438, the remote service 108 performs speech recognition the third audio signal to generate third text. At 440, the remote service 108 identifies the qualifier from the text (e.g., "upstairs", "kitchen", "television", etc.) along with the request to perform the operation. FIG. 4D concludes the illustration of the process 400 and includes, at 442, identifying the devices associated with the qualifiers. At 444, the remote service 108 sends an instruction to each device associated with the qualifier to perform the requested operation. In some instances, the remote service 108 performs this operation by sending individual instructions to the individual devices, while in other instances the remote service 108 may send an instruction to a local hub in the local environment, which may distribute the instructions. At 446, each device within the environment associated with the qualifier, including the voice-controlled device 104, receives the instruction and, at 448, executes the instruction to perform the requested operation.

Figure 5:
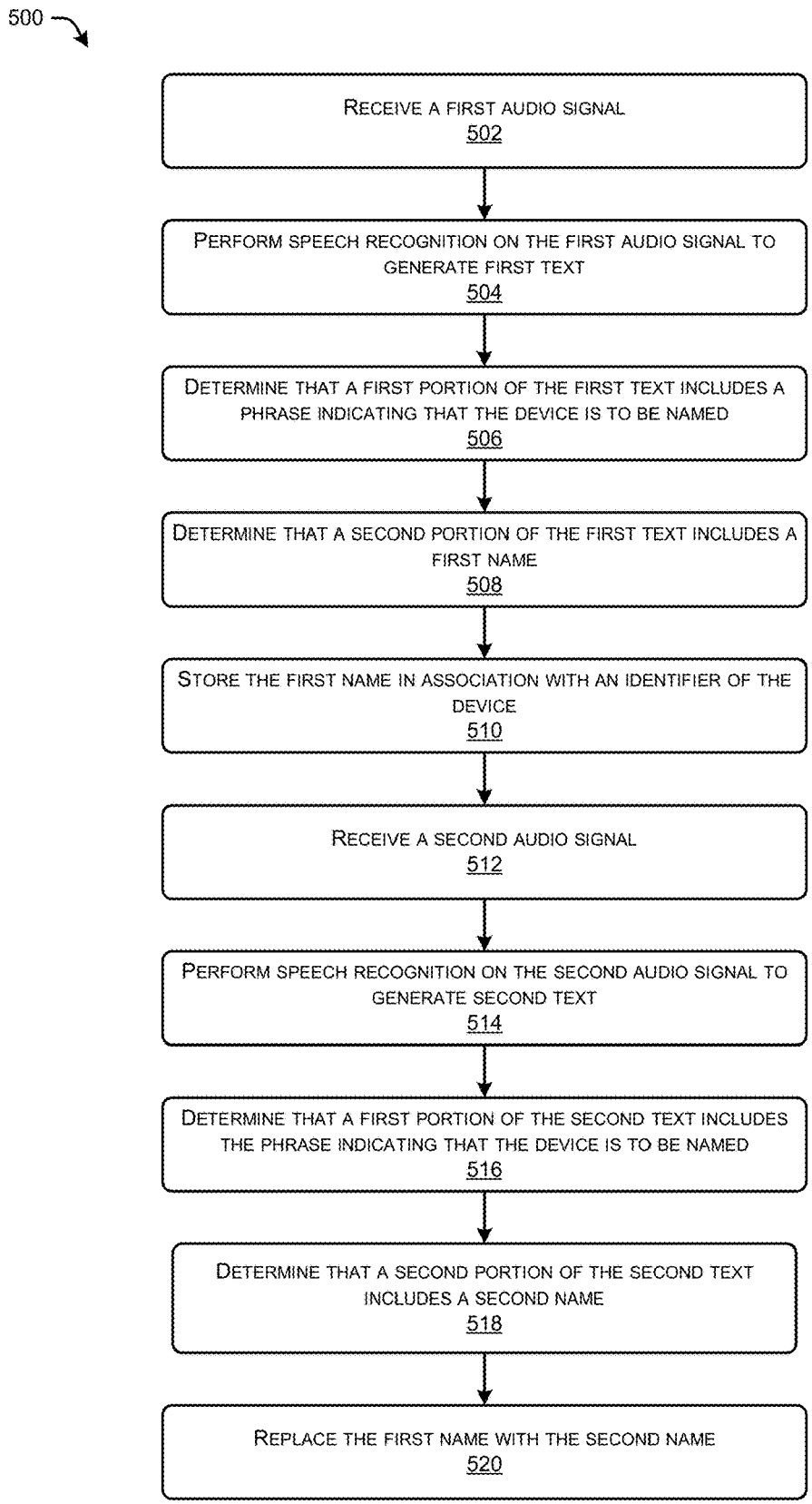
FIG. 5 is a flow diagram of an example process for associating a first name with a device in response to a first audible request from a user and, therefore, associating a second name with the device in response to a second audible request from a user.

FIG. 5 is a flow diagram of an example process 500 for associating a first name with a device in response to a first audible request from a user and, therefore, associating a second name with the device in response to a second audible request from a user. At 502, the process 500 receives a first audio signal, with this first audio signal including a phrase indicating that a device is to be named and a name. At 504, the process 500 performs speech recognition on the first audio signal to generate first text. At 506, the process 500 determines that a first portion of the text includes a phrase indicating that a device is to be named. At 508, the process 500 also determines that a second portion of the text includes a first name to assign to the device (e.g., "the kitchen device"). At 510, the process 500 stores the first name in association with an identifier of the device.

At 512, the process 500 receives a second audio signal, with this second audio signal including a phrase indicating that the device is to be re-named and a new name for the device. At 514, the process 500 performs speech recognition on the second audio signal to generate second text. At 516, the process 500 determines that a first portion of the text includes a phrase indicating that the device is to be re-named. At 518, the process 500 also determines that a second portion of the second text includes a second name to assign to the device (e.g., "the office device"). At 520, the process 500 replaces the first name in memory with the second name, thus effectuating the renaming of the device.

Figure 6:
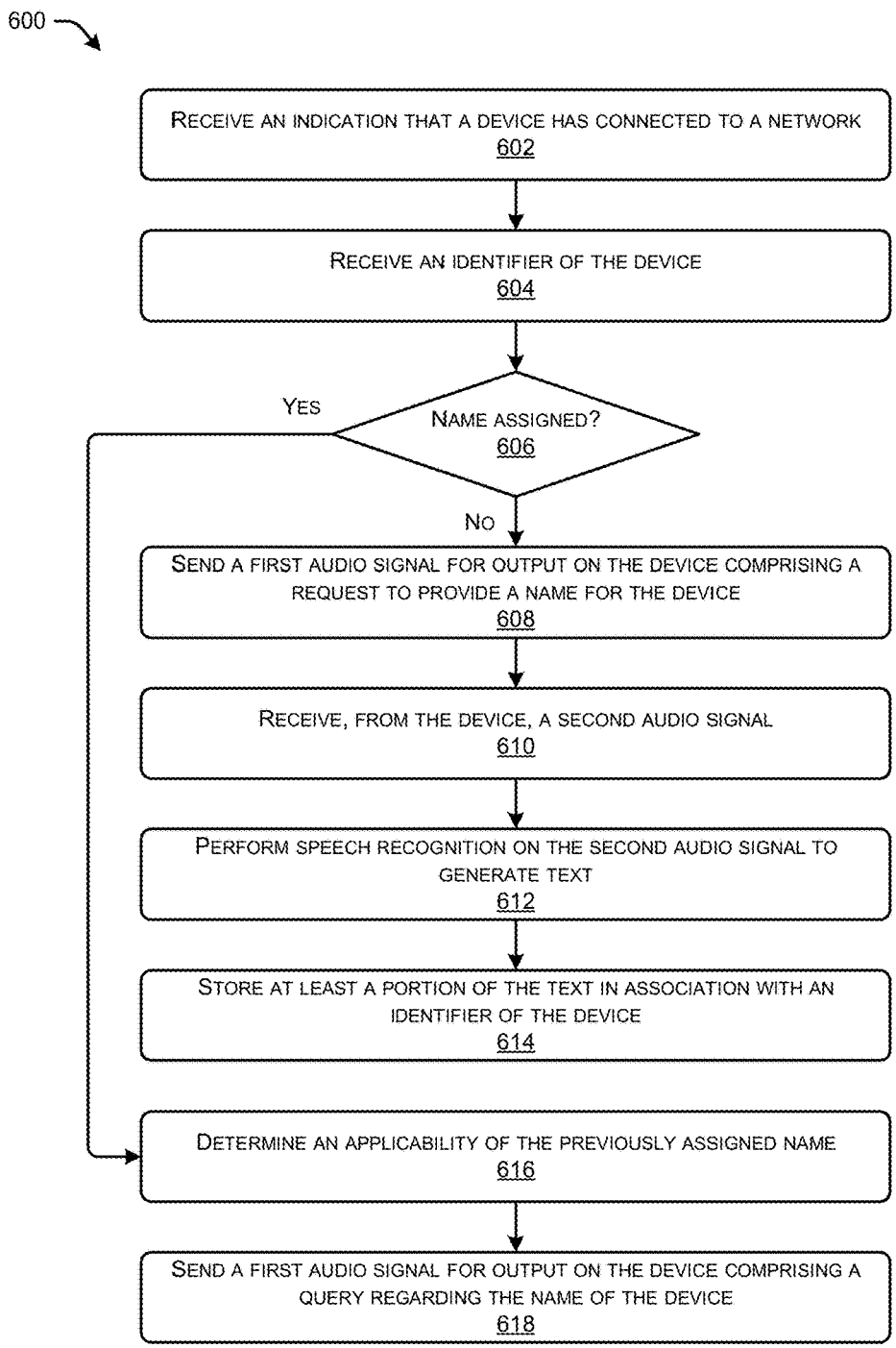
FIG. 6 is a flow diagram of an example process for determining that a device has connected with a network and, in response, determining if the device associated with a name or role. If not, then the process may output a query regarding whether a user would like to assign a name or role to the device. If a name or role has already been assigned, however, the process may determine whether the name or role is still applicable to the device.

FIG. 6 is a flow diagram of an example process 600 for determining that a device has connected with a network and, in response, determining if the device associated with a name or role. If not, then the process may output a query regarding whether a user would like to assign a name or role to the device. If a name or role has already been assigned, however, the process may determine whether the name or role is still applicable to the device.

At 602, the process 600 receives an indication that a device has connected to a network. In addition, at 604 the process 600 receives an identifier of this device. At 606, the process 600 determines, using the identifier, whether the device has previously been associated with a name. If not, then at 608 the process 600 sends a first audio signal for output by the device, with the first audio signal comprising a request to provide a name for the device. For instance, the audio signal, when received at the device, may cause the device to output the following example query "would you like to provide a name for this device?" or the like. At 610, the process 600 receives a second audio signal based on sound captured by the local device. This sound may include speech of the user providing a name (e.g., "yes, please name it the kitchen device"). At 612, the process 600 performs speech recognition on the second audio signal to generate second text. At 614, the process 600 stores at least a portion of the text in association with the identifier of the device. As such, the user is now able to control this device via voice commands by referencing the assigned name of the device (e.g., "the kitchen device").

If, however, the device has previously been associated with a name, as determined at 606, then at 616 the process 600 may determine a current applicability of the name. For instance, because the device may have been named when connected to a different network, it is possible that the previously assigned name is no longer applicable to the device. To determine the current applicability of the previously assigned name, the process 600 may reference one or more criteria, such as whether the device is connected to a new network, whether the device senses short-range wireless signals from new devices not previously sensed by the device, whether signal strengths have changed by more than a threshold amount, or the like. At 618, the process 600 may then send an audio signal comprising a query regarding the applicability of the name for output at the device. For instance, if the process 600 determined that the name is likely still applicable (e.g., because the device is still proximate to the same short-range wireless signals as when the device was named), then the query may comprise a suggestion to maintain the current name or may otherwise reference the current name (e.g., "Would you like to continue calling this the kitchen device?") If, however, the name is determined to be no longer applicable, the query may simply ask "would you like to rename this device?" or the like.

Figure 7:
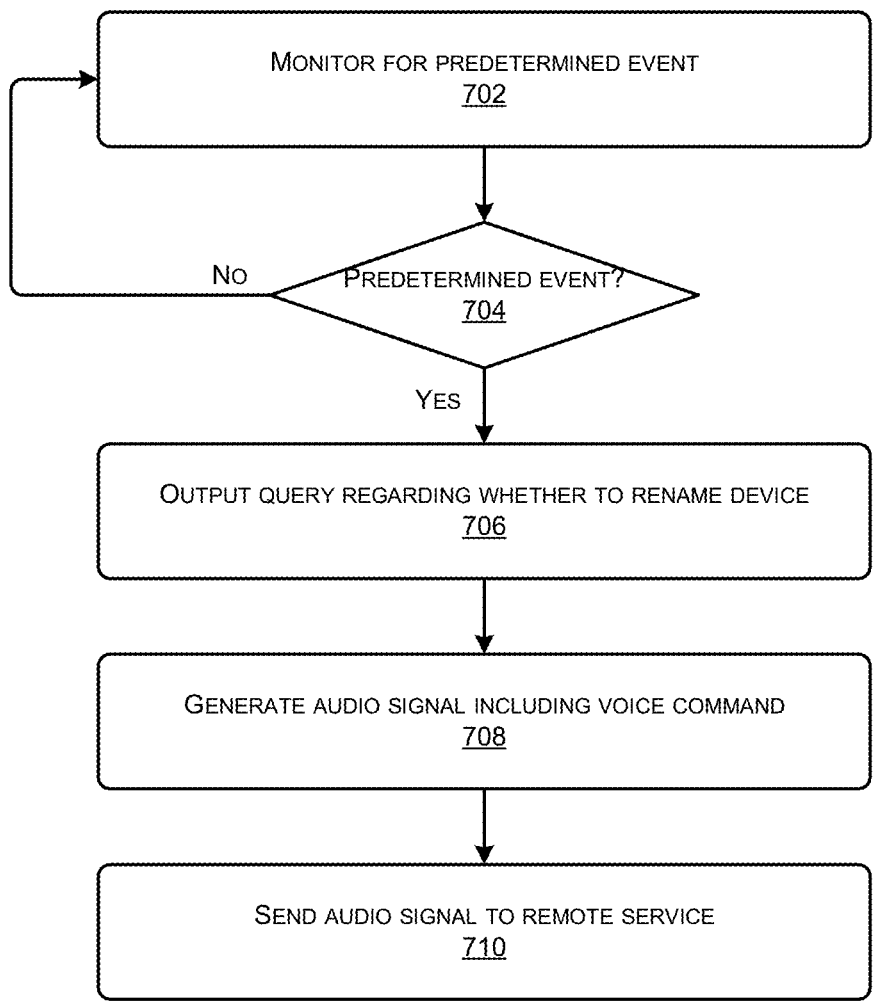
FIG. 7 is a flow diagram of an example process for outputting a query regarding whether a user would like to rename a device in response to identifying a predefined, triggering event.

FIG. 7 is a flow diagram of an example process 700 for outputting a query regarding whether a user would like to rename a device in response to identifying a predefined, triggering event. At 702, the process 700 monitors for a predefined event. For instance, a voice-controlled device may be configured to determine when it connects to a new network, when it sense one or more new short-range wireless signals, when it is unplugged, when a signal strength changes by more than a threshold, or like. At 704, the process 700 queries whether the device has sensed a predetermined event. If not, then the process 700 continues its monitoring. If, however, the device identifies a predetermined event, then at 706 the process 700 may output a query regarding whether the user would like to rename the device. At 708, the process 700 generated an audio signal including a voice command (e.g., "yes, please call this my office device", or "no, thank you"). At 710, the device sends the audio signal to a remote service, which may perform speech recognition on the audio signal to determine whether or not to associate a new name with the identifier of the device.

Figure 8:
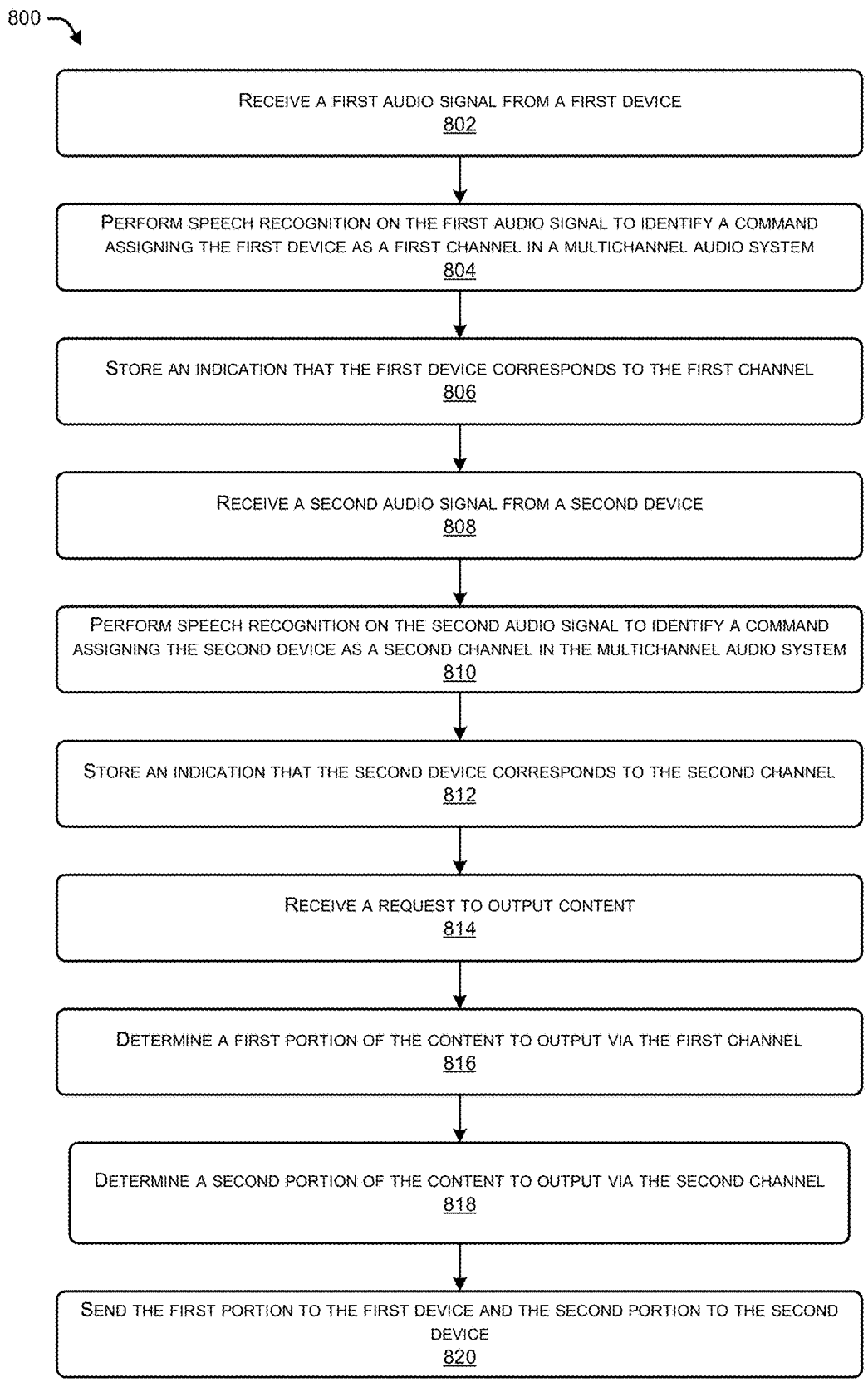
FIG. 8 is a flow diagram of an example process for assigning different channels of a multichannel audio system to different devices. For instance, the process may store an indication that a first voice-controlled device is to correspond to a first channel in a surround sound system, while a second voice-controlled device is to correspond to a second channel in the surround sound system.

FIG. 8 is a flow diagram of an example process 800 for assigning different channels of a multichannel audio system to different devices. For instance, the process may store an indication that a first voice-controlled device is to correspond to a first channel in a surround sound system, while a second voice-controlled device is to correspond to a second channel in the surround sound system.

At 802, the process 800 receives a first audio signal from a first voice-controlled device in an environment. At 804, the process performs speech recognition on the first audio signal to identify a first voice command indicating that the first voice-controlled device is to correspond to a first channel in a multichannel audio system. At 806, the process 800 stores a first indication that the first voice-controlled device corresponds to the first channel in the multichannel audio system. In some instances, the process 800 may also include determining whether and/or how to modify functionality of the first device to implement the role of the first channel of the multichannel audio system. In some instances, this includes determining a type, brand, or the like of the first device to determine how to optimize the device for the role. The process 800 may then a configuration code to the first device to cause the first device to execute the functionality for fulfilling the role of the first channel.

At 808, the process 800 receives a second audio signal from a second voice-controlled device in the environment. At 810, the process 800 performs speech recognition on the second audio signal to identify a second voice command indicating that the second voice-controlled device is to correspond to a second channel in the multichannel audio system. At 812, the process 800 stores a second indication that the first voice-controlled device corresponds to the second channel in the multichannel audio system. Further, in some instances, the process 800 may also include determining whether and/or how to modify functionality of the second device to implement the role of the second channel of the multichannel audio system. In some instances, this includes determining a type, brand, or the like of the second device to determine how to optimize the device for the role. The process 800 may then a configuration code to the first device to cause the second device to execute the functionality for fulfilling the role of the second channel.

At 814, the process 800 receives, from a device in the environment, a request to output content in the environment, with this the content including audio content. At 816, the process 800 determines a first portion of the audio content designated for output by the first channel of the multichannel audio system. At 818, the process 800 determines a second portion of the audio content designated for output by the second channel of the multichannel audio system. Finally, at 820, the process 800 sends the first portion of content to the first device and the second portion of content to the second device.

In other instances, meanwhile, in response to receiving the request for content, the process 800 may send the requested content to one or more devices within the environment, such as a central hub. This central hub may comprise one of the voice-controlled devices or may comprise a different device. In either event, the device(s) may execute the received content such the first voice-controlled device outputs a first portion of the content corresponding to the first channel, the second voice-controlled device outputs a second portion of the content corresponding to the second channel, a display device outputs a portion of the content for display, and the like.

Figure 9:
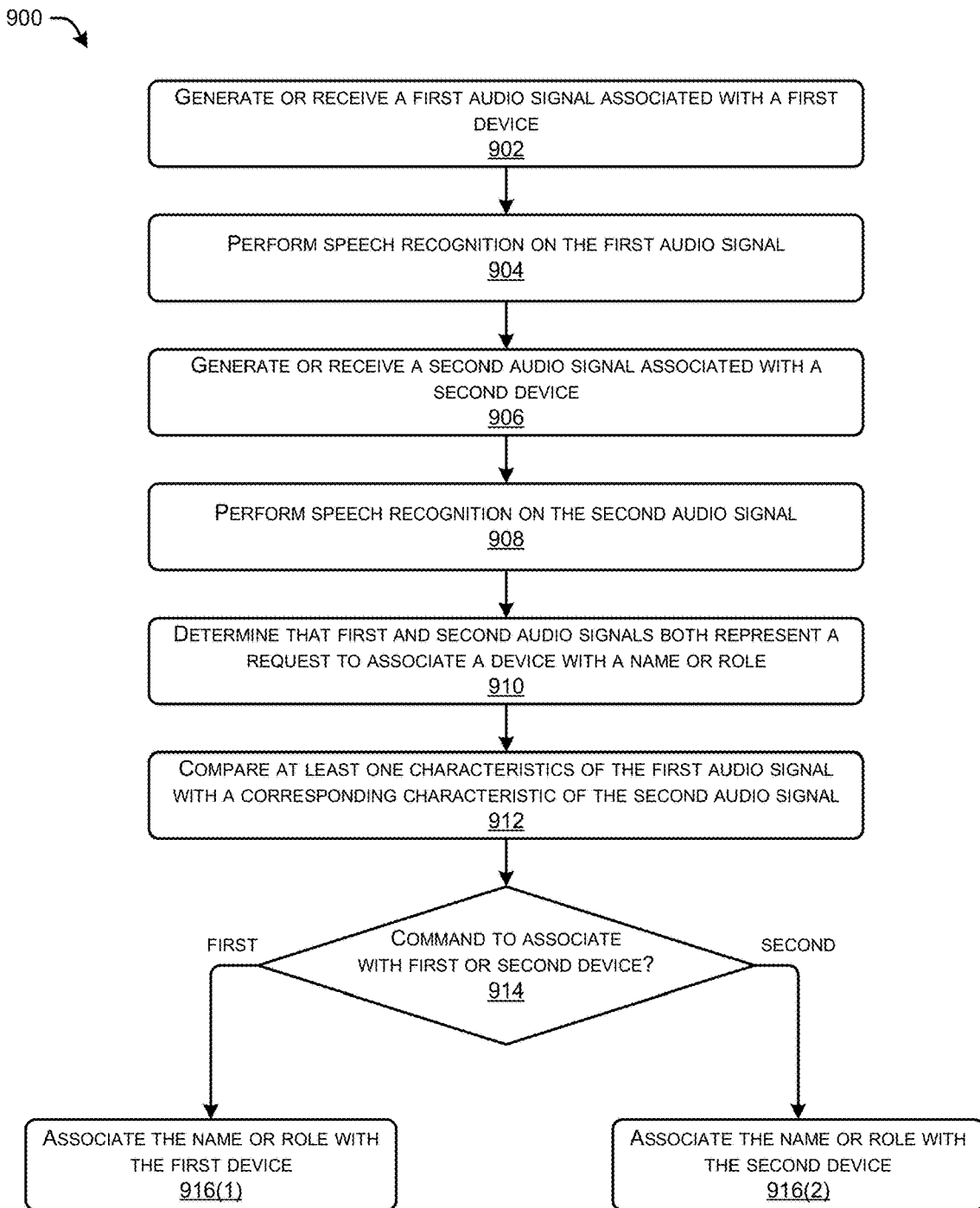

FIG. 9 is a flow diagram of an example process 900 for determining whether a voice command captured by audio signals from different devices is direct to a first of the devices or the second of the devices. For instance, in instances where both a first and a second voice-controlled device generates an audio signal that includes a voice command requesting that a device be associated with a particular name or role, the process may determine which device the user intended to provide this command to. As described above, this process may be performed on local devices, at a remote service, or a combination thereof.

At 902, the process 900 generates or receives a first audio signal associated with a first device. For instance, the first device may generate the first audio signal, or the remote service may receive the first audio signal from the first device. At 904, the process 900 performs speech recognition on the first audio signal. At 906, the process 900 generates or receives a second audio signal associated with a second device. For instance, the second device may generate the second audio signal, or the remote service may receive the second audio signal from the second device. At 908, the process 900 performs speech recognition on the second audio signal.

At 910, the process 900 determines that both the first and second audio signals represent a request to associate a device with a particular name or role. At 912, the process 900 compare at least one characteristic of the first audio signal to corresponding characteristic of the second audio signal. Based on this comparison, at 914 the process 900 determines whether the voice command is a command to associate the name or role with the first device or the second device. If the process 900 determines that the command is to associate the name or role with the first device, then at 916(1) the process 900 associates the name or role with the first device. This may include storing an indication of the association, or sending an indication of the association from the first device to the remote service or vice versa. If, however, the process 900 determines that the command is to associate the name or role with the second device, then at 916(2) the process 900 associates the name or role with the second device. This may include storing an indication of the association, or sending an indication of the association from the second device to the remote service or vice versa.

Figure 10:
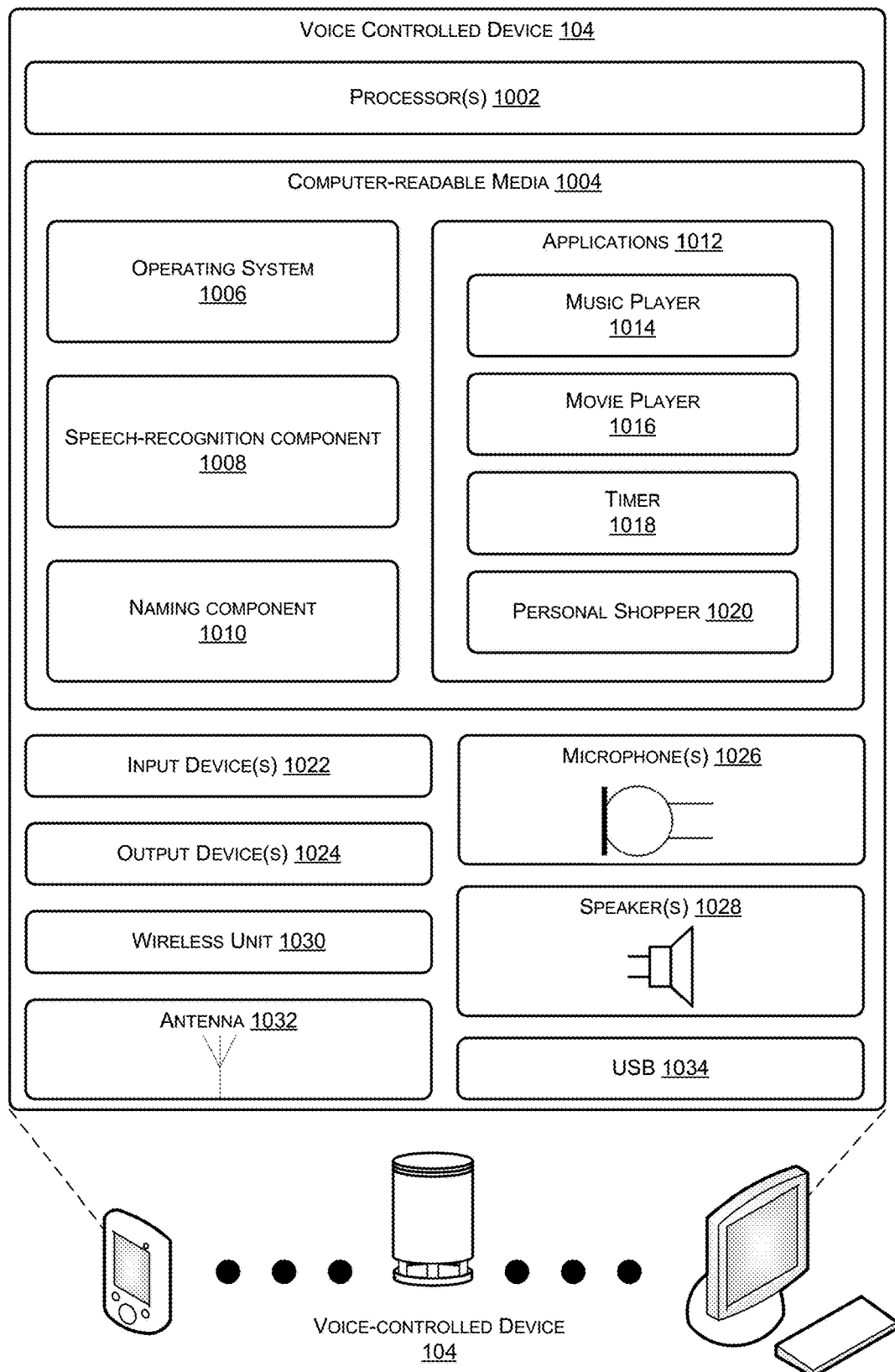
FIG. 10 shows a functional block diagram of selected components implemented at a user device, such as the voice-controlled device of FIG. 1.

FIG. 10 shows selected functional components of a natural language input controlled device, such as the voice-controlled device 104. The voice-controlled device 104 may be implemented as a standalone device 104 that is relatively simple in terms of functional capabilities with limited input/output components, memory, and processing capabilities. For instance, in one particular non-limiting example, the voice-controlled device 104 does not have a keyboard, keypad, or other form of mechanical input. Nor does it have a display (other than simple lights, for instance) or touch screen to facilitate visual presentation and user touch input. Instead, the device 104 may be implemented with the ability to receive and output audio, a network interface (wireless or wire-based), power, and processing/memory capabilities. In certain implementations, a limited set of one or more input components may be employed (e.g., a dedicated button to initiate a configuration, power on/off, etc.). Nonetheless, the primary and potentially only mode of user interaction with the device 104 is through voice input and audible output. In some instances, the device 104 may simply comprise a microphone, a power source (e.g., a battery), and functionality for sending generated audio signals to another device.

The voice-controlled device 104 may also be implemented as a mobile device such as a smart phone or personal digital assistant. The mobile device may include a touch-sensitive display screen and various buttons for providing input as well as additional functionality such as the ability to send and receive telephone calls. Alternative implementations of the voice-controlled device 104 may also include configuration as a personal computer. The personal computer may include a keyboard, a mouse, a display screen, and any other hardware or functionality that is typically found on a desktop, notebook, netbook, or other personal computing devices. The illustrated devices, however, are merely examples and not intended to be limiting, as the techniques described in this disclosure may be used in essentially any device that has an ability to recognize speech input or other types of natural language input.

In the illustrated implementation, the voice-controlled device 104 includes one or more processors 1002 and computer-readable media 1004. In some implementations, the processor(s) 1002 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 1002 may possess its own local memory, which also may store program modules, program data, and/or one or more operating systems.

The computer-readable media 1004 may include volatile and nonvolatile memory, removable and non-removable media implemented in any method or technology for storage of information, such as computer-readable instructions, data structures, program modules, or other data. Such memory includes, but is not limited to, random access memory "RAM," read-only memory "ROM," electrically erasable programmable read-only memory ("EEPROM"), flash memory or other memory technology, CD-ROM, DVD, or other optical storage, magnetic cassettes, magnetic tape, magnetic disk storage or other magnetic storage devices, RAID storage systems, or any other medium which can be used to store the desired information and which can be accessed by a computing device. The computer-readable media 1004 may be implemented as computer-readable storage media ("CRSM"), which may be any available physical media accessible by the processor(s) 1002 to execute instructions stored on the computer-readable media 1004. In one basic implementation, CRSM may include RAM and Flash memory. In other implementations, CRSM may include, but is not limited to, read-only memory ("ROM"), EEPROM, or any other tangible medium which can be used to store the desired information and which can be accessed by the processor(s) 1002.

Several modules such as instruction, datastores, and so forth may be stored within the computer-readable media 1004 and configured to execute on the processor(s) 1002. A few example functional modules are shown as applications stored in the computer-readable media 1004 and executed on the processor(s) 1002, although the same functionality may alternatively be implemented in hardware, firmware, or as a system on a chip (SOC).

An operating system module 1006 may be configured to manage hardware and services within and coupled to the device 104 for the benefit of other modules. In addition, in some instances the device 104 may a speech-recognition component 1008 that employs any number of conventional speech processing techniques such as use of speech recognition, natural language understanding, and extensive lexicons to interpret voice input. In some instances, the speech-recognition component 1008 may simply be programmed to identify the user uttering a predefined word or phrase (i.e., a "wake word"), after which the device 104 may begin uploading audio signals to the remote service 108 for more robust speech-recognition processing. In other examples, the device 104 itself may, for example, identify voice commands from users and may provide indications of these commands to the remote service 108. In some instances, the voice-controlled device 104 also includes the naming component 1010, which may have some or all of the functionality described above with reference to the naming component 122.

The voice-controlled device 104 may also include a plurality of applications 1012 stored in the computer-readable media 1004 or otherwise accessible to the device 104. In this implementation, the applications 1012 are a music player 1014, a movie player 1016, a timer 1018, and a personal shopper 1020. However, the voice-controlled device 104 may include any number or type of applications and is not limited to the specific examples shown here. The music player 1014 may be configured to play songs or other audio files. The movie player 1016 may be configured to play movies or other audio-visual media. The timer 1018 may be configured to provide the functions of a simple timing device and clock. The personal shopper 1020 may be configured to assist a user in purchasing items from web-based merchants.

Generally, the voice-controlled device 104 has input devices 1022 and output devices 1024. The input devices 1022 may include a keyboard, keypad, mouse, touch screen, joystick, control buttons, etc. In some implementations, one or more microphones 1026 may function as input devices 1022 to receive audio input, such as user voice input. The output devices 1024 may include a display, a light element (e.g., LED), a vibrator to create haptic sensations, or the like. In some implementations, one or more speakers 1028 may function as output devices 1024 to output audio sounds.

A user 102 may interact with the voice-controlled device 104 by speaking to it, and the one or more microphone(s) 1026 captures the user's speech. The voice-controlled device 104 can communicate back to the user by emitting audible statements through the speaker 1028. In this manner, the user 102 can interact with the voice-controlled device 104 solely through speech, without use of a keyboard or display.

The voice-controlled device 104 may further include a wireless unit 1030 coupled to an antenna 1032 to facilitate a wireless connection to a network. The wireless unit 1030 may implement one or more of various wireless technologies, such as Wi-Fi, Bluetooth, radio frequency (RF), and so on. A universal serial bus ("USB") port 1034 may further be provided as part of the device 104 to facilitate a wired connection to a network, or a plug-in network device that communicates with other wireless networks. In addition to the USB port 1034, or as an alternative thereto, other forms of wired connections may be employed, such as a broadband connection.

Accordingly, when implemented as the primarily-voice-operated device 104, there may be no input devices, such as navigation buttons, keypads, joysticks, keyboards, touch screens, and the like other than the microphone(s) 1026. Further, there may be no output such as a display for text or graphical output. The speaker(s) 1028 may be the main output device. In one implementation, the voice-controlled device 104 may include non-input control mechanisms, such as basic volume control button(s) for increasing/decreasing volume, as well as power and reset buttons. There may also be a simple light element (e.g., LED) to indicate a state such as, for example, when power is on.

Accordingly, the device 104 may be implemented as an aesthetically appealing device with smooth and rounded surfaces, with one or more apertures for passage of sound waves. The device 104 may merely have a power cord and optionally a wired interface (e.g., broadband, USB, etc.). As a result, the device 104 may be generally produced at a low cost. Once plugged in, the device may automatically self-configure, or with slight aid of the user, and be ready to use. In other implementations, other input/output components may be added to this basic model, such as specialty buttons, a keypad, display, and the like.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A method comprising:
receiving an audio signal from a device that includes at least one microphone, the audio signal generated based at least in part on sound captured by the at least one microphone;
determining that a first portion of the audio signal represents a phrase that indicates that the device is to be named and that a second portion of the audio signal represents a functional identifier to be associated with the device; and
storing the functional identifier in association with an identifier of the device.

2. The method as recited in claim 1, further comprising:
receiving, from the device, a second audio signal;
performing speech recognition on the second audio signal;
determining that the second audio signal represents speech that is associated with the functional identifier and that requests an operation to be performed;
determining that the functional identifier corresponds to the identifier; and
sending, to the device, an instruction to perform the operation.

3. The method as recited in claim 2, further comprising:
receiving, from the device, a third audio signal;
performing speech recognition on the third audio signal;
determining that the third audio signal represents second speech that requests that the device and a second device both perform a second operation, the device and the second device being within a same environment; and
sending, to the device and the second device, a second instruction to perform the second operation.

4. The method as recited in claim 1, wherein the functional identifier includes a location qualifier that indicates a location of the device within an environment, and further comprising storing the location qualifier in association with the identifier.

5. The method as recited in claim 1, wherein the functional identifier includes a device-type qualifier that indicates a type of the device, and further comprising storing the device-type qualifier in association with the identifier.

6. The method as recited in claim 1, wherein receiving the audio signal from the device comprises receiving the audio signal from the device at least partly in response to the device determining that a user has uttered a predefined word or phrase.

7. The method as recited in claim 1, wherein the functional identifier is stored in memory of a computing device, and further comprising:
receiving a second audio signal;
performing speech recognition on the second audio signal;
determining that the second audio signal represents speech that requests that the device be associated with a second functional identifier; and
replacing, in the memory of the computing device, the functional identifier with the second functional identifier.

8. The method as recited in claim 1, further comprising sending, to the device and at least partly prior to receiving the audio signal, data representing a suggestion of the functional identifier, the data for causing the device to present the suggestion of the functional identifier.

9. The method as recited in claim 1, wherein the second portion of the audio signal is subsequent to the first portion of the tea-audio signal.

10. The method as recited in claim 1, further comprising sending, to the device, a configuration code to cause the device to perform functionality corresponding to the functional identifier.

11. A system comprising:
memory;
one or more processors; and
one or more computer-executable instructions that are stored in the memory and that are executable by the one or more processors to perform operations comprising:
receiving an audio signal from a device that includes at least one microphone, the audio signal generated based at least in part on sound captured by the at least one microphone;
determining that a first portion of the audio signal represents a phrase that indicates that the device is to be named and that a second portion of the audio signal represents a functional identifier to be associated with the device; and
storing the functional identifier in association with an identifier of the device.

12. The system as recited in claim 11, wherein the operations further comprise:
receiving, from the device, a second audio signal;
performing speech recognition on the second audio signal;
determining that the second audio signal represents speech that is associated with the functional identifier and that requests an operation to be performed;
determining that the functional identifier corresponds to the identifier; and
sending, to the device, an instruction to perform the operation.

13. The system as recited in claim 12, wherein the operations further comprise:
receiving, from the device, a third audio signal;
performing speech recognition on the third audio signal;
determining that the third audio signal represents second speech that requests that the device and a second device both perform a second operation, the device and the second device being within a same environment; and
sending, to the device and the second device, a second instruction to perform the second operation.

14. The system as recited in claim 11, wherein the functional identifier includes a location qualifier that indicates a location of the device within an environment, and wherein the operations further comprise storing the location qualifier in association with the identifier.

15. The system as recited in claim 11, wherein the functional identifier includes a device-type qualifier that indicates a type of the device, and wherein the operations further comprise storing the device-type qualifier in association with the identifier.

16. The system as recited in claim 11, wherein receiving the audio signal from the device comprises receiving the audio signal from the device at least partly in response to the device determining that a user has uttered a predefined word or phrase.

17. The system as recited in claim 11, wherein the functional identifier is stored in memory of a computing device, and wherein the operations further comprise:
- receiving a second audio signal;
- performing speech recognition on the second audio signal;
- determining that the second audio signal represents speech that requests that the device be associated with a second functional identifier; and
- replacing, in the memory of the computing device, the functional identifier with the second functional identifier.

18. The system as recited in claim 11, wherein the operations further comprise sending, to the device and at least partly prior to receiving the audio signal, data representing a suggestion of the functional identifier, the data for causing the device to present the suggestion of the functional identifier.

19. The system as recited in claim 11, wherein the second portion of the audio signal is subsequent to the first portion of the audio signal.

20. The system as recited in claim 11, wherein the operations further comprise sending, to the device, a configuration code to cause the device to perform functionality corresponding to the functional identifier.

* * * * *